United States Patent
Kanazawa et al.

(10) Patent No.: US 7,717,998 B2
(45) Date of Patent: May 18, 2010

(54) ULTRAFINE PARTICLE GROUTING COMPOSITION

(75) Inventors: Tomohiro Kanazawa, Hokkaido (JP); Hirokatsu Kawakami, Osaka (JP)

(73) Assignees: Nittetsu Cement Co., Ltd., Hokkaido (JP); Nippon Shokubai Co., Ltd., Osaka-shi (JP)

( * ) Notice: Subject to any disclaimer, the term of this patent is extended or adjusted under 35 U.S.C. 154(b) by 464 days.

(21) Appl. No.: 11/672,305

(22) Filed: Feb. 7, 2007

(65) Prior Publication Data

US 2007/0181041 A1    Aug. 9, 2007

(30) Foreign Application Priority Data

Feb. 7, 2006    (JP) ............... 2006-030177
Feb. 7, 2006    (JP) ............... 2006-030178

(51) Int. Cl.
*C04B 24/04* (2006.01)
*C04B 24/24* (2006.01)
(52) U.S. Cl. ............... 106/728; 106/696; 106/715; 106/789; 106/823; 405/264; 405/266
(58) Field of Classification Search ............... 106/790, 106/696, 778, 782, 789, 728, 715, 823; 405/264, 405/266
See application file for complete search history.

(56) References Cited

U.S. PATENT DOCUMENTS 7,559,987 B2 *  7/2009  Sato et al. ............... 106/790

FOREIGN PATENT DOCUMENTS

| JP | 3-26783 A | 2/1991 |
|---|---|---|
| JP | 8-41455 A | 2/1996 |
| JP | 8-319484 A | 12/1996 |
| JP | 11-116316 A | 4/1999 |
| JP | 2000-70700 A | 3/2000 |
| JP | 3423913 B2 | 4/2003 |
| JP | 2004-231884 A | 8/2004 |

OTHER PUBLICATIONS

"Permeation Limit of Grouts With Ultra-Fine Granular Materials", Japan Society of Civil Engineers Collected Papers, 1991, 2, No. 426, V-14, pp. 237-240.

* cited by examiner

*Primary Examiner*—Paul Marcantoni
(74) *Attorney, Agent, or Firm*—Connolly Bove Lodge & Hutz LLP

(57) ABSTRACT

To provide an ultrafine particle grouting composition which is excellent in dispersibility and dispersion retainability and can be easily injected into minute spaces between particles of grounds, rock cracks, and the like. An ultrafine particle grouting composition comprising ultrafine particle cement, wherein the ultrafine particle grouting composition is at least one selected from the group consisting of the following (i) and (ii): (i) the ultrafine particle grouting composition comprises ultrafine particle cement (A) and a polycarboxylic acid dispersant (C), and the ultrafine particle cement (A) comprises blast furnace slag and gypsum, and the ultrafine particle cement (A) has 10% by volume or less of particles having a particle diameter of 16 μm or more in powder form of the cement; and (ii) the ultrafine particle grouting composition comprises ultrafine particle cement (B) and a polycarboxylic acid dispersant (D), and the ultrafine particle cement (B) comprises 2 to 25% by weight of cement clinker containing 5% by weight or less of $3CaO.Al_2O_3$, 74 to 97% by weight of blast furnace slag, and 1 to 5% by weight of gypsum, and the ultrafine particle cement (B) has 60 to 80% by volume of particles having a particle diameter of 1 to 5 μm in powder form of the cement.

14 Claims, No Drawings

ULTRAFINE PARTICLE GROUTING COMPOSITION

CROSS-REFERENCE TO RELATED APPLICATIONS

This application claims priority from Japanese Applications 2006-030177 filed Feb. 7, 2006 and 2006-030178, filed Feb. 7, 2006 disclosures of which are incorporated herein by reference.

TECHNICAL FIELD

The present invention relates to ultrafine particle grouting compositions and production methods thereof. More specifically, the present invention relates to a grout which contains a polycarboxylic acid copolymer and can be used for improvement or water shutoff by being injected into grounds or rocks in civil engineering and construction fields, and a production method thereof. The present invention also relates to a slurry grout which contains cement composed of ultrafine particles having an extremely small particle diameter and can be used for improvement or water shutoff by being injected into grounds or rocks in civil engineering and construction fields, and a production method thereof.

BACKGROUND ART

Cement particles-containing grouting composition are used by being injected into spaces between particles of grounds or rock cracks for water shutoff, prevention of liquefaction, improvement of soft grounds, or prevention of leakage of toxic substances. Such compositions have been widely used in foundation works in civil engineering and construction. Such compositions have been used for ground improvement (ground reinforcement) and water shutoff at the time of construction of barrage, tunnel, subway, waterworks and sewer, and the like. Slurry cement grouting compositions obtained by mixing a cement grout with water and stirring the mixture have been used as such cement grouting compositions. In this case, dispersants are used in order to enhance dispersibility of the cement particles, thereby improving performances thereof as a grouting composition. Slurries obtained by mixing a cement grout, a dispersant, and water with each other and stirring the mixture have been used. Examples of such a cement grout include Ordinary Portland cement, High early strength Portland cement, blast furnace cement, colloid cement, and ultrafine particle cement. The particle diameter of the cement grout is important for performances of the cement grouting compositions. The injectability of the composition can be improved by reducing the particle diameter, generally. The ultrafine particle cement is the most excellent in injectability and useful, among the cement grouts.

If the slurry ultrafine particle cement grouting composition is used, the dispersant is essential in order to prevent aggregation of the particles in the cement grout and thereby improve and maintain the performances of the grouting composition. Naphthalene dispersants used as a cement dispersant have been used, because the ultrafine particle cement grouting composition contains a cement component. Normal type naphthalene dispersants and retardation type naphthalene dispersants have been mainly used as such naphthalene dispersants. The normal type naphthalene dispersants have been desired to be more excellent in dispersibility. The retardation type naphthalene dispersants have been desired to be more excellent by reducing the setting retardation. In a cement dispersant field, polycarboxylic acid dispersants have been used as cement dispersants with high dispersion functions. However, for ultrafine particle cement grouting compositions, the polycarboxylic acid dispersants were inferior to naphthalene dispersants in permeability, permeability retainability, and setting characteristics. That is, advantages of the polycarboxylic acid dispersants have not been recognized conventionally even if the polycarboxylic acid dispersants used in the cement dispersant field are used for the ultrafine particle cement grouting composition.

For example, Japanese Kokai Publication No. Hei-08-319484, Japanese Kokai Publication No. Hei-08-41455, Japanese Kokai Publication No. Hei-11-116316, and Japanese Kokai Publication No. 2004-231884 disclose technologies of using a conventional polycarboxylic acid dispersant for an ultrafine particle cement grouting composition. However, in these technologies, polycarboxylic acid dispersants which are commercially available in the cement dispersant field are used. No polycarboxylic acid dispersants which can exhibit sufficient performances in the ultrafine particle cement grouting composition field, in comparison to the naphthalene dispersants, have been known. That is, the grouting compositions contain cement, but are used under the condition that a ratio of water to cement is higher than that in concrete or mortar. Further, the particle size of the cement particles contained in the compositions is largely different from that of the cement particles contained in concrete or mortar. Therefore, sufficient performances were not obtained if the technologies of the polycarboxylic acid dispersants in a conventional cement dispersant field are applied for the grouting compositions. Therefore, the ultrafine particle grouting compositions have been desired to sufficiently exhibit various characteristics needed as an ultrafine particle grouting composition, such as permeation performances, permeation retainability performances, and setting characteristics, by taking advantage of the polycarboxylic acid dispersants.

Mixtures which contains Portland cement or Portland cement clinker (hereinafter, referred to as cement clinker), blast furnace slag and gypsum and has the maximum particle diameter of about 10 to 16 µm have been used as conventional ultrafine particle cement grouts.

Japanese Patent No. 3423913 discloses, for example, ultrafine particle cement composed of particles in which an amount of particles with about 2 µm or less and the particle size are specified for improving dispersibility or reducing an apparent coarsening of the particles caused by aggregation. Such ultrafine particle cement within a specific particle size range has improved injectability in comparison with that of the conventional ultrafine particle cement. However, such cement can not be injected in some cases because of the particle diameter, depending on spaces between particles or rock cracks into which the cement is injected. Accordingly, an ultrafine particle cement grouting composition excellent in injectability and capable of corresponding to various grounds or rocks has been desired.

Ultrafine particle cements with a particle diameter smaller than necessary, for example, super ultrafine particle cements having a particle diameter smaller than that of the ultrafine particle cements have a strong aggregation function. Therefore, aggregation between the particles is found even in dry state, and a phenomenon in which an aggregation rate in a slurry is extremely high is observed. Accordingly, the particles in the slurry tend to disperse insufficiently, and the aggregation accelerates the apparent coarsening of the particles. Use of such a slurry as a grout causes reduction in injectability (for example, referring to Akira Mori, Masahito Tamura, Yasushi Aoki, "Permeability limit of ultrafine particle grout", Japan Society of Civil Engineers collected papers, No. 426/V-14, pp 237-240 (1991. 2))

Because of the above-mentioned circumstances, Japanese Kokai Publication No. Hei-03-26783 discloses a high-pressure dispersion treatment method or Japanese Kokai Publication No. 2000-70700 discloses a method of removing aggregated particles after ultrasonic treatment, in order to enhance the dispersibility of the cement particles and thereby improve the injectability. However, in these methods, particular devices are needed and the production lines are complicated, or the particles tend to be aggregated again after the dispersion treatment. Therefore, these methods have room for improvement in order to enhance the dispersion retainability and the like and thereby improve the injectability. The method of removing aggregated particles after ultrasonic treatment is also insufficient in injection efficiency because slurry which should be discarded is generated. Therefore, practical application of an ultrafine particle cement grout-containing grouting composition expected to have extremely high injectability is needed. There is room for improvement in order to improve the dispersibility or the dispersion retainability of the ultrafine particle cement grout by an industrially simple method, and to provide a composition which is advantageous also in terms of injection efficiency.

SUMMARY OF THE INVENTION

The present invention has been made in view of the above-mentioned state of the art. The present invention has an object to provide an ultrafine particle grouting composition which is excellent in dispersibility and dispersion retainability and can be easily injected into minute spaces between particles of grounds, rock cracks, and the like. The present invention also has an object to provide an ultrafine particle grouting composition which can be easily injected into extremely minute spaces between particles of grounds or rock cracks into which conventional ultrafine particle cement grout could not be injected due to the particle diameter and to provide a method for producing such an ultrafine particle grouting composition without particular facilities or production lines.

The present inventors have made various investigations on ultrafine particle grouting compositions. The inventors found that if a specific ultrafine particle grouting composition has a polycarboxylic acid copolymer, aggregation of cement particles can be suppressed as much as possible due to excellent dispersion effects of the polycarboxylic acid copolymer, and thereby such a composition can exhibit injectability more excellent than that of conventional ultrafine particle cement grouting compositions. The inventors also found that if the polycarboxylic acid copolymer has repeating units derived from specific monomers, such a composition exhibit more excellent injectability. The inventors found that the polycarboxylic acid copolymer-containing ultrafine particle grouting composition of the present invention is more excellent in dispersibility or setting characteristics than conventional naphthalene dispersant-containing ultrafine particle grouting compositions. The inventors also found that if the proportions of the monomers constituting the repeating units contained in the polycarboxylic acid copolymer are specified, the dispersibility of the particles is excellent, and therefore the ultrafine particle grouting composition can be excellent in permeability or injectability. The inventors further found that if even polycarboxylic acid dispersants are used, the ultrafine particle grouting composition can have permeability, permeability retainability, and setting characteristics equivalent to or better than those in the cases where naphthalene cement dispersants are used, by using a polycarboxylic acid copolymer having a long polyethylene oxide chain as a side chain and a larger amount of carboxylic acids in the main chain. Thereby, the above-mentioned problems are admirably solved, leading to completion of the present invention.

The present inventors also found that if a polycarboxylic acid dispersant is contained as an essential component in an ultrafine particle grouting composition containing ultrafine particle cement containing specific components at specific proportions and containing particles having a extremely small specific particle diameter, the aggregation of the cement particles can be suppressed as much as possible due to the excellent dispersion effects of the polycarboxylic acid dispersant, and thereby such a composition can exhibit injectability more excellent than that of conventional ultrafine particle cement grouts. The inventors also found that an ultrafine particle grouting composition can be produced by a production method including a high-speed stirring step of performing mixing and stirring at a specific speed in the presence of the polycarboxylic acid dispersant or by a two-step water addition stirring method of performing water addition and stirring twice or more, and thereby the ultrafine particle grouting composition can be more excellent in dispersibility and dispersion retainability, and therefore such a composition can be preferably used in an injection application. The inventors also found that these production methods need no particular device and therefore the ultrafine particle grouting composition can be easily produced inexpensively. The above-mentioned problems can be admirably solved, leading to completion of the present invention.

That is, the present invention is an ultrafine particle grouting composition comprising ultrafine particle cement, wherein the ultrafine particle grouting composition is at least one selected from the group consisting of the following (i) and (ii): (i) the ultrafine particle grouting composition comprises ultrafine particle cement (A) and a polycarboxylic acid dispersant (C), and the ultrafine particle cement (A) comprises blast furnace slag and gypsum, and the ultrafine particle cement (A) has 10% by volume or less of particles having a particle diameter of 16 μm or more in powder form of the cement; and (ii) the ultrafine particle grouting composition comprises ultrafine particle cement (B) and a polycarboxylic acid dispersant (D), and the ultrafine particle cement (B) comprises 2 to 25% by weight of cement clinker containing 5% by weight or less of $3CaO.Al_2O_3$, 74 to 97% by weight of blast furnace slag, and 1 to 5% by weight of gypsum, and the ultrafine particle cement (B) has 60 to 80% by volume of particles having a particle diameter of 1 to 5 μm in powder form of the cement.

In the ultrafine particle cement contained in the grouting composition of the present invention, the constitutional components and the particle amount are specified as mentioned above.

Preferred embodiments of the present invention are as follows.

(1) It is preferable that the ultrafine particle cement (A) contained in the ultrafine particle grouting composition comprises 45 to 97% by weight of the blast furnace slag, 2 to 15% by weight of the gypsum, and 0 to 40% by weight of Portland cement.

(2) It is preferable that the ultrafine particle cement (A) contained in the ultrafine particle grouting composition has 30% by volume or less of particles having a particle diameter of 2 μm or less.

(3) It is preferable that the polycarboxylic acid dispersant (C) or (D) comprises a polycarboxylic acid copolymer having a repeating unit derived from an unsaturated polyalkylene glycol monomer and a repeating unit derived from an unsaturated carboxylic acid monomer.

(4) It is preferable that the polycarboxylic acid dispersant (C) or (D) comprises a polycarboxylic acid copolymer having a repeating unit derived from a monomer represented by the formula (1):

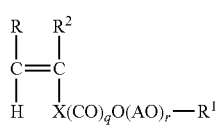

(1)

(in the formula, $R^1$ representing a hydrogen atom or a hydrocarbon group containing 1 to 30 carbon atoms; R and $R^2$ being the same or different and each representing a hydrogen atom or a methyl group; X representing a hydrocarbon group containing 1 to 5 carbon atoms; AO representing an oxyalkylene group containing 2 to 18 carbon atoms; p being 0, 1, or 2; q being 0 or 1; r representing a molar number of addition of the oxyalkylene group and being an integer of 2 to 300); and a repeating unit derived from a monomer represented by the formula (2):

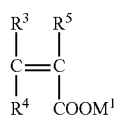

(2)

(in the formula, $R^3$ and $R^4$ being the same or different and each representing a hydrogen atom, a methyl group, or —$COOM^2$, but not representing —$COOM^2$ simultaneously; $R^5$ representing a hydrogen atom, a methyl group, or —$CH_2COOM^3$; $R^3$ and $R^4$ being the same or different and each representing a hydrogen atom or a methyl group when $R^5$ being —$CH_2COOM^3$; $M^1$, $M^2$, and $M^3$ each representing one selected from the group consisting of a hydrogen atom, monovalent metals, divalent metals, ammonium groups, and organic amine groups).

(5) It is preferable that a ratio (Y)/(X) of a molar number (Y) of the monomer represented by the formula (2) to a molar number (X) of the monomer represented by the formula (1) is 2.5 or more in the polycarboxylic acid copolymer contained in the polycarboxylic acid dispersant (C).

(6) It is preferable that the r in the monomer represented by the formula (1) is an integer of 2 to 100 in the polycarboxylic acid copolymer contained in the polycarboxylic acid dispersant (C).

The present invention is also a production method of the ultrafine particle grouting composition, wherein the production method comprises a high-speed stirring step of performing mixing and stirring at a peripheral speed of 314 m/min or more.

The present invention is also a production method of the ultrafine particle grouting composition, wherein the production method comprises a step of: mixing and stirring ultrafine particle cement and water; adding water; and performing stirring again.

DETAILED DESCRIPTION OF THE INVENTION

Hereafter, the present invention will be described in detail.

The ultrafine particle grouting composition of the present invention contains the polycarboxylic acid copolymer. One embodiment of the ultrafine particle grouting composition of the present invention is an embodiment in which an ultrafine particle grouting composition comprising ultrafine particle cement, wherein (i) the ultrafine particle grouting composition comprises ultrafine particle cement (A) and a polycarboxylic acid dispersant (C), and the ultrafine particle cement (A) comprises blast furnace slag and gypsum, and the ultrafine particle cement (A) has 10% by volume or less of particles having a particle diameter of 16 μm or more in powder form of the cement.

Hereinafter, preferable embodiments in the above-mentioned embodiment (i) are mentioned below. The embodiment (i) and the preferable embodiments in the embodiment (i) are preferably applied also to the below-mentioned embodiment (ii).

Such a polycarboxylic acid copolymer can function as a dispersant and the like in the ultrafine particle grouting composition, and disperse ultrafine particles (also referred to as ultrafine particle grout or ultrafine particle cement) in the ultrafine particle grouting composition, without aggregation as much as possible and enables the composition to serve as a grout excellent in permeability, permeation retainability, and setting characteristics.

It is preferable that the above-mentioned polycarboxylic acid copolymer has a repeating unit derived from an unsaturated polyalkylene glycol monomer and a repeating unit derived from an unsaturated carboxylic acid monomer. That is, the copolymer has a free carboxyl group and a polyalkylene glycol chain, and exhibits dispersion performances in the ultrafine particle grouting composition, and enables the ultrafine particle grouting composition to have excellent dispersibility (permeability) and dispersion retainability. For example, one or two or more different carboxylic acid cement dispersants containing the polycarboxylic acid copolymer having the above-mentioned structure may be used.

It is preferable that the above-mentioned polycarboxylic acid copolymer contains the repeating unit derived from the monomer represented by the above formula (1) and the repeating unit derived from the monomer represented by the above formula (2). With respect to the ratio of the monomers, a ratio (Y)/(X) of a molar number (Y) of the monomer represented by the above formula (2) to a molar number (X) of the monomer represented by the above formula (1) is preferably 2.5 or more. If the ratio (Y)/(X) is less than 2.5, the carboxylic acid amount is insufficient, and therefore the ultrafine particle grouting composition containing the polycarboxylic acid copolymer may have insufficient permeability or injectability. The ultrafine particle grouting composition contains an ultrafine particle grout (ultrafine particle cement). Such ultrafine particle cement contains particles having a small particle diameter and a wide surface area. Therefore, the polycarboxylic acid copolymer needs to have improved adsorption property by containing more carboxylic acids. Such increase in carboxylic acid amount leads to improvement in permeability of the ultrafine particle grouting composition. The ratio (Y)/(X) is more preferably 3.5 or more, and still more preferably 6 or more. The upper limit of the ratio is not especially limited, and preferably 30 or less, and more preferably 25 or less, and still more preferably 20 or less. The range of the ratio is preferably 6 to 20. As mentioned above, the preferable embodiments of the present invention include the ultrafine particle grouting composition, wherein a ratio (Y)/(X) of a molar number of the monomer (Y) of the monomer represented by the formula (2) to a molar number (X) of the monomer represented by the formula (1) is 2.5 or more in the polycarboxylic copolymer.

Molar number means amount of substance (mol).

R in the monomer represented by the above formula (1) is preferably a hydrogen atom.

X in the monomer represented by the above formula (1) has a structure of —$(CH_2)_p$— (P is 0, 1, or 2).

The above-mentioned polycarboxylic acid copolymer has a free carboxyl group and a polyalkylene glycol chain. Therefore, use of a small amount of the copolymer enables the composition to exhibit high dispersibility and high dispersion retainability property due to steric hindrance. If the copolymer has a polyalkylene glycol in a side chain, the dispersibility and the dispersion retainability vary depending on the length of the main chain, the length of the side chain, and the like.

It is preferable that the above-mentioned polycarboxylic acid copolymer has a long side chain. The ultrafine particle grouting composition containing such a copolymer having a long side chain can be excellent in dispersibility (permeability) and dispersion retainability. The chain length of the side chain, and the dispersibility and the dispersion retainability are conceptually explained below. If the side chain is long, the steric hindrance easily occurs, and therefore it is difficult for ultrafine cement particles to which the polycarboxylic acid copolymers have adsorbed to approach to each other. As a result, the composition is excellent in dispersibility. When adsorbed to surfaces of specific ultrafine cement particles, the polycarboxylic acid copolymers are difficult to approach each other due to the steric hindrance. Therefore, it can be suppressed that the polycarboxylic acid copolymers excessively cover the ultrafine cement particles. Therefore, it can be secured enough that the ultrafine cement particles are brought into contact with water, and thereby hydration is allowed to proceed and the setting is completed for a short time, resulting in shorter hardening time.

If the copolymer has a short chain, the steric hindrance hardly occurs, and therefore the polycarboxylic acid copolymer covers the ultrafine cement particles and the hydration of the ultrafine cement particles is prevented, which may extend the time required for setting. As mentioned above, the polycarboxylic acid copolymer preferably has a long side chain because the dispersibility and the dispersion retainability can be excellent.

It is preferable that the r in the monomer represented by the formula (1) is an integer of 2 to 300 in the above-mentioned polycarboxylic acid copolymer. If the r is less than 2, the polyalkylene glycol side chain is short, and therefore the dispersibility and the hardenability may be insufficient. If the r is more than 300, the polymerizability may be reduced. The r is more preferably an integer of 2 to 100, and still more preferably an integer of 10 to 100, and furthermore preferably an integer of 50 to 100. As mentioned above, the preferable embodiments of the present invention also include the ultrafine particle grouting composition, wherein the r in the monomer represented by the formula (1) is an integer of 2 to 100 in the polycarboxylic acid copolymer.

Commonly used cement dispersants tend to have lower water reducing performances and lower slump retainability as the carboxylic acid amount increases. However, the ultrafine particle grouting composition has more improved permeability or injectability, because the dispersibility of the particles becomes excellent as the carboxylic acid amount increases. In a cement application, the cement composition can be used even if slightly containing aggregated particles. However, in an injection application in which the composition is injected into spaces between particles of the grounds, rock cracks, and the like for ground improvement or water shutoff at barrage, tunnel, or disposal site of toxic substances, the fine particles ideally disperse to be primary particles. Therefore, in such an application, the dispersibility and the dispersion retainability are important.

A polycarboxylic acid copolymer not having a sulfonic acid skeleton may be used as the above-mentioned polycarboxylic acid copolymer. The sulfonic acid skeleton is a structure derived from a monomer having a sulfonic acid group. Therefore, in the present invention, the dispersibility of the ultrafine particle cement can be exhibited in an embodiment in which the copolymer has no sulfonic acid groups as a functional group exhibiting acidity. The sulfonic acid group exhibits insufficient absorption functions for the ultrafine particle cement, which is different from the carboxylic acid group. Therefore, if the copolymer contains such a sulfonic acid group, the dispersibility of the ultrafine particle cement may be insufficiently improved. Therefore, it is preferable that the polycarboxylic acid copolymer contains no sulfonic acid groups in terms of sufficient exhibition of the functional effects of the present invention.

In the above formula (1), preferred examples of the hydrocarbon group containing 1 to 30 carbon atoms in $R^1$ specifically include $C_{1-30}$ alkyl groups, $C_{6-30}$ benzene ring-containing aromatic groups, such as phenyl groups, alkylphenyl groups, phenylalkyl groups, phenyl groups substituted with (alkyl)phenyl group, and naphthyl groups. The $R^1$ is preferably a methyl group, an ethyl group, a propyl group, a butyl group, an isobutyl group, a pentyl group, a hexyl group, an octyl group, a nonyl group, a lauryl group, a cetyl group, a stearyl group, a phenyl group, or a benzyl group, and still preferably a methyl group, an ethyl group, or a propyl group.

The above-mentioned number of carbon atoms of $R^1$ is preferably 1 to 22, and more preferably 1 to 18, and still more preferably 1 to 12, and furthermore preferably 1 to 6, and particularly preferably 1 to 5, and most preferably 1 to 3.

It is preferable that the AO in the above-mentioned formula (1) is an oxyalkylene group containing 2 to 18 carbon atoms. The number of carbon atoms in AO is suitably 2 to 18, and more preferably 2 to 8, and more preferably 2 to 4. The AO is still more preferably an oxyalkylene group containing 2 or 3 carbon atoms. Specific examples thereof include —$CH_2CH_2O$—, —$CH_2CH_2CH_2O$—, —$CH(CH_3)CH_2O$—, and —$CH_2CH(CH_3)O$—. Among them, —$CH_2CH_2O$—, —$CH(CH_3)CH_2O$—, and —$CH_2CH(CH_3)O$— are preferred, and —$CH_2CH_2O$— is more preferred.

It is preferable that p is 0, 1, or 2, and q is 0 or 1 in the above formula (1). The p and the q are not especially limited as long as they are within the above-mentioned ranges, respectively. An embodiment (1) in which the p is 0 and the q is 1 and an embodiment (2) in which the p is 1 or 2 and the q is 0 are more preferable.

In the above embodiment (1), an embodiment in which $R^4$ is H in the above-mentioned formula (2) is preferable. If $R^4$ is H, the above-mentioned polycarboxylic acid copolymer is a polycarboxylic acid copolymer (P-1) having a polyoxyalkylene ester constitutional unit (I) represented by the following formula (3):

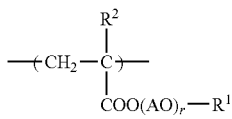

(3)

(in the formula, $R^1$, $R^2$, and r being the same as those in the above formula (1), respectively), and a carboxylic acid constitutional unit (II) represented by the formula (4):

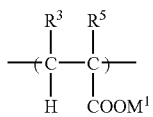

(4)

(in the formula, $R^3$, $R^5$, and $M^1$ being the same as those in the above formula (2), respectively).

In the above embodiment (2), the above-mentioned polycarboxylic acid copolymer is a polycarboxylic acid copolymer (P-2) having a polyoxyalkylene ether constitutional unit (III) represented by the following formula (5):

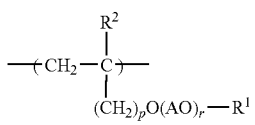

(5)

(in the formula, p is 1 or 2, $R^1$, $R^2$, and r are the same as those in the above formula (1), respectively), and a carboxylic acid constitutional unit (IV) represented by the following formula (6):

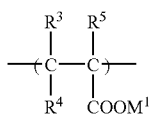

(6)

(in the formula, $R^3$, $R^4$, $R^5$, and $M^1$ being the same as those in the above formula (2), respectively).

That is, the polycarboxylic acid copolymer of the present invention (also referred to as polycarboxylic acid copolymer (P)) preferably includes the above-mentioned polycarboxylic acid copolymer (P-1) and/or the above-mentioned polycarboxylic acid copolymer (P-2). Such a polycarboxylic acid copolymer (P) may contain only the above-mentioned polycarboxylic acid copolymer (P-1) and/or the above-mentioned polycarboxylic acid copolymer (P-2), may contain other components, and preferably mainly contains the above-mentioned polycarboxylic acid copolymer (P-1) and/or the above-mentioned polycarboxylic acid copolymer (P-2). Each of the above-mentioned polycarboxylic acid copolymers (P-1) and (P-2) has the above-mentioned essential constitutional units (repeating units), and may further contain a constitutional unit (V) derived from a monomer (e) mentioned below. One or two or more different these constitutional units may be contained in the copolymers.

The above-mentioned polycarboxylic acid copolymer (P-1) can be produced by copolymerizing a monomer component essentially containing a monomer providing the constitutional unit (I) (for example, a monomer (a) mentioned below), and a monomer providing the constitutional unit (II) (for example, a monomer (b) mentioned below). Such a monomer component may further contain a monomer providing the constitutional unit (V) (for example, a monomer (e) mentioned below). If one species is used as each of the constitutional units, one species of the monomer providing the constitutional unit may be used. If two species are used as each of the constitutional units, two or more species of the monomer providing the constitutional unit may be used.

With the ratio between the constitutional units constituting the above-mentioned polycarboxylic acid copolymer (P-1), the constitutional unit (I)/the constitutional unit (II)/the constitutional unit (V) is preferably 1 to 99/99 to 1/0 to 50 at a ratio by weight. The constitutional unit (I)/the constitutional unit (II)/the constitutional unit (V) is more preferably 50 to 99/50 to 1/0 to 49, and still more preferably 60 to 95/40 to 5/0 to 30, and most preferably 65 to 90/35 to 10/0 to 10. The total of the constitutional unit (I), the constitutional unit (II), and the constitutional unit (V) is 100% by weight.

The above-mentioned polycarboxylic acid copolymer (P-1) may be produced by directly esterifying at least part of carboxyl groups of a polymer obtained by polymerizing a monomer component essentially containing a monomer providing the constitutional unit (II) (for example, a monomer (b) mentioned below), with an alkoxypolyalkylene glycol.

If the copolymer contains one species of the above-mentioned constitutional unit (I), it is preferable that the copolymer essentially contains an oxyethylene group in the oxyalkylene group for securing the balance between hydrophilicity and hydrophobicity. The oxyethylene group preferably accounts for 50% by mol or more, and particularly preferably 60% by mol or more. If the copolymer contains two or more species of the above-mentioned constitutional unit (I), it is preferable that the copolymer essentially contains an oxyethylene group in the oxyalkylene group of any one species of the constitutional unit (I).

Examples of the above-mentioned monomer (a) providing the constitutional unit (I) include: $C_{2-18}$ alkylene oxide adducts of dehydrogenated (oxidized) reactants of (meth) acrylic acid, crotonic acid or fatty acid; or ester compounds of (meth)acrylic acid or crotonic acid with alkoxypolyalkylene glycols obtained by adding $C_{2-18}$ alkylene oxides into any of $C_{1-30}$ saturated aliphatic alcohols such as methanol, ethanol, 2-propanol, 1-butanol, 1-pentanol, 1-hexanol, octanol, 2-ethyl-1-hexanol, nonyl alcohol, lauryl alcohol, cetyl alcohol, and stearyl alcohol. The ester compounds of (meth) acrylic acid or crotonic acid with alkoxypolyalkylene glycols, which corresponds to the case where $R^1$ in the above formula (3) is a hydrocarbon group containing 1 to 30 carbon atoms, are preferable.

Specific examples of the above-mentioned monomer (a) include the following compounds. Various alkoxypolyethylene glycol mono(meth)acrylates such as methoxypolyethylene glycol mono(meth)acrylate, ethoxypolyethylene glycol mono(meth)acrylate, 1-propoxypolyethylene glycol mono (meth)acrylate, and 2-propoxypolyethylene glycol mono (meth)acrylate;

various alkoxypolyalkylene glycol mono(meth)acrylates such as methoxypolyethylenepolypropylene glycol mono (meth)acrylate, ethoxypolyethylenepolypropylene glycol mono(meth)acrylate, 1-propoxypolyethylenepolypropylene glycol mono(meth)acrylate, and 2-propoxypolyethylenepolypropylene glycol mono(meth)acrylate.

Examples of the above-mentioned monomer (b) providing the constitutional unit (II) represented by the above formula (4) include acrylic acid, methacrylic acid, crotonic acid and metal salts thereof, ammonium salts thereof, and amine salts thereof. (Meth)acrylic acid and salts thereof are particularly preferable. The above-mentioned polycarboxylic acid copolymer (P-2) can be produced by copolymerizing a monomer component essentially containing a monomer providing the constitutional unit (III) (for example, a monomer (c) mentioned below), and a monomer providing the constitutional unit (IV) (for example, a monomer (d) mentioned below). Such a monomer component may further contain a monomer providing the constitutional unit (V) (for example, a monomer (e) mentioned below).

With the ratio between the constitutional units constituting the above-mentioned polycarboxylic acid copolymer (P-2), the constitutional unit (III)/the constitutional unit (IV)/the constitutional unit (V) is preferably 1 to 99/99 to 1/0 to 50 at a ratio by weight. The constitutional unit (III)/the constitutional unit (IV)/the constitutional unit (V) is more preferably 50 to 99/50 to 1/0 to 49, and still more preferably 60 to 95/40 to 5/0 to 30, and most preferably 65 to 90/35 to 10/0 to 10. The total of the constitutional unit (III), the constitutional unit (IV), and the constitutional unit (V) is 100% by weight.

The above-mentioned polycarboxylic acid copolymer (P-2) also can be produced by adding an average of 2 to 300 mol of alkylene oxides into polymers obtained by copolymerizing a monomer component essentially containing an unsaturated alcohol such as allyl alcohol, methallyl alcohol, 3-methyl-3-butene-1-ol with a monomer providing the constitutional unit (IV) (for example, a monomer (d) mentioned below) per 1 mol of unsaturated alcohol used in copolymerization, in other words, 1 mol of unsaturated alcohol constitutional unit in polymers or by reacting the polymer with an alkoxypolyalkylene glycol into which an average 2 to 300 of oxyalkylene groups are added per 1 mol of alkoxypolyalkylene glycols. In the above formula (5), the average molar number of addition of the oxyalkylene group "r" is preferably as mentioned above. $R^1$ is preferably a hydrogen atom. If $R^1$ is a hydrocarbon group containing 1 to 30 carbon atoms, $R^1$ is preferably as mentioned above. Further, p is 1 or 2.

If the copolymer contains one species of the above-mentioned constitutional unit (III), the copolymer has the same embodiment as mentioned above in the case where the copolymer contains one species of the above-mentioned constitutional unit (I).

Examples of the above-mentioned monomer (d) providing the constitutional unit (IV) represented by the above formula (6) include unsaturated monocarboxylic acid monomers such as acrylic acid, methacrylic acid, crotonic acid and metal salts thereof, ammonium salts thereof, and amine salts thereof; unsaturated dicarboxylic acid monomers such as maleic acid, itaconic acid, citraconic acid, fumaric acid or metal salts thereof, ammonium salts thereof, and amine salts thereof. Anhydrides thereof also may be used, and for example, maleic anhydride, itaconic anhydride, citraconic anhydride may be mentioned. Particularly, (meth)acrylic acid, maleic acid, maleic anhydride, and salts thereof are preferably used.

The monomer (e) providing the constitutional unit (V) which can be used in the present invention is not especially limited as long as it is copolymerizable with at least one of the other monomers. The following compounds may be mentioned, for example. Half esters and diesters of unsaturated dicarboxylic acids such as maleic acid, fumaric acid, itaconic acid, and citraconic acid, with $C_{1-30}$ alcohols; half amides, diamides of the above-mentioned unsaturated dicarboxylic acids with $C_{1-30}$ amines; half esters and diesters of the unsaturated dicarboxylic acids with alkyl(poly)alkylene glycols prepared by adding 1 to 500 mol of $C_{2-18}$ alkylene oxides into 1 mol of the above-mentioned alcohols or the above-mentioned amines; half esters and diesters of the above-mentioned unsaturated dicarboxylic acids with $C_{2-18}$ glycols or polyalkylene glycols into which an average of 2 to 300 mol of the $C_{2-18}$ glycols are added per 1 mol of polyalkylene glycols.

Esters of $C_{1-30}$ alcohols with unsaturated monocarboxylic acids such as methyl(meth)acrylate, ethyl (meth)acrylate, propyl(meth)acrylate, glycidyl (meth)acrylate, methyl crotonate, ethyl crotonate, and propyl crotonate; amide compounds of $C_{1-30}$ amines with unsaturated monocarboxylic acids, such as methyl (meth)acrylamide; vinyl aromatic compounds such as styrene, α-methyl styrene, vinyl toluene, p-methyl styrene; unsaturated amide compounds such as (meth)acrylamide, (meth)acryl alkylamide, N-methylol (meth)acrylamide, and N,N-dimethyl(meth)acrylamide; unsaturated cyan compounds such as (meth)acrylonitrile and α-chloroacrylonitrile;

unsaturated esters such as vinyl acetate, and vinyl propionate; unsaturated amine compounds such as aminoethyl (meth)acrylate, methylaminoethyl(meth)acrylate, dimethylaminoethyl(meth)acrylate, dimethylaminopropyl (meth) acrylate, dibuthylaminoethyl(meth)acrylate, vinylpyridine; divinyl aromatic compounds such as divinyl benzene; cyanurate compounds such as triallyl cyanurate; allyl compounds such as (meth)allyl alcohol and glycidyl (meth)allyl ether; unsaturated amino compounds such as dimethylaminoethyl (meth)acrylate; vinyl ethers or allyl ethers such as methoxy polyethylene glycol monovinyl ether, polyethylene glycol monovinyl ether, methoxypolyethylene glycol mono(meth) allyl ether, and polyethylene glycol mono(meth)allyl ether;

The addition amount of the above-mentioned polycarboxylic acid copolymer is not especially limited, but is preferably 0.05 to 5.0% by weight on solids content equivalent basis, relative to 100% by weight of the ultrafine particle grout. If the addition amount is less than 0.05% by weight, the ultrafine particle grouting composition may insufficiently exhibit the dispersibility and the dispersion retainability. If the addition amount is more than 5% by weight, the addition amount is too large and the costs increase, resulting in economic inefficiency. The addition amount is more preferably 0.1 to 3.0% by weight, and still more preferably 0.15 to 2.0% by weight, and particularly preferably 0.2 to 1.0% by weight.

The ultrafine particle grouting composition of the present invention contains the above-mentioned polycarboxylic acid copolymer, and can be preferably used as a grout because the ultrafine particles (also referred to as ultrafine particle grout or ultrafine particle cement) contained in the ultrafine particle grouting composition are sufficiently dispersed.

The above-mentioned ultrafine particle cement (A) is not especially limited as long as the functional effects of the present invention are exhibited and the cement (A) contains the blast furnace slag and the gypsum and has 10% by volume or less of particles having a particle diameter of 16 μm or more. Commonly used ultrafine particle cements can be used.

The ultrafine particle grouting composition in accordance with the above-mentioned embodiment (i) contains the ultrafine particle cement (A).

Such a composition exhibits excellent injectability.

The above-mentioned ultrafine particle grouting cement (A) has 10% by volume or less of particles having a particle diameter of 16 μm or more. Within such a particle amount, the injectability into spaces between particles of grounds, rock cracks, and the like can be improved, advantageously.

The above-mentioned particle amount is preferably measured by subjecting the cement (A) to treatment for three minutes by an ultrasonic washing machine (output 40 W, frequency 40 kHz) using ethanol as a dispersion medium.

The above-mentioned particle amount represents a particle amount of particles having a particle diameter of 16 μm or more contained in the ultrafine particle grout. The amount of the particles having a particle diameter of 16 μm or more in the ultrafine particle grout can be measured using Laser Diffraction Particle Size Analyzer (product of Shimazu Corp., SALD-2000J, a refractive index of 1.70±0.20i).

The above-mentioned ultrafine particle cement (A) is not especially limited as long as the functional effects of the present invention are exhibited. Portland cements (Ordinary Portland cement, moderate heat cement, sulfate resisting cement, low heat cement and low-alkali cements thereof) is preferably used. Fly ash, silica fume, limestone powder, kaolin, and clay minerals such as bentonite may be added. These may be used singly or in combination of two or more species of them. Among then, the above-mentioned ultrafine particle cement (A) essentially containing Portland cement is more preferable in view of strength exhibition property.

Cement clinker may be used instead of the above-mentioned Portland cement. The cement clinker contains, as a main mineral, $3CaO.SiO_2$ (also referred to as C3S), $2CaO.SiO_2$, $3CaO.Al_2O_3$ (also referred to as C3A), and $4CaO.Al_2O_3.Fe_2O_3$. The cement clinker has hydration activity and grindability each largely varying depending on the content of these minerals. The content of these minerals is not especially limited as long as the functional effects of the present invention are exhibited. A larger amount of dispersants is adsorbed to the C3A among these minerals, in comparison to the other minerals. Therefore, reduction in the C3A content enables for the initial dispersant concentration in a slurry to be kept high, and the ultrafine particle grouting composition can have high dispersion retainability. It is known that the C3A has high initial hydration property and therefore not only accelerates aggregation of the particles but also reacts with the gypsum rapidly to generate ettringite $(3CaO.Al_2O_3.3CaSO_4.32H_2O)$ as an initial hydrate that inhibits the injection. The C3A is segregated to the fine particles side at the time of pulverization. If the cement clinker is more finely pulverized, the number of super ultrafine C3A particles remarkably increases and thereby the ultrafine particle grouting composition may insufficiently exhibit high dispersibility and high dispersion retainability. Therefore, the content of the C3A is preferably reduced.

It is preferable that the above-mentioned C3A is 5% by weight or less relative to 100% by weight of the cement clinker. If the content of the C3A is more than 5% by weight, the injectability of the ultrafine particle grouting composition may be deteriorated due to the properties of the above-mentioned C3A. Particularly, excellent initial injectability may not be obtained. The content of the C3A is more preferably 4% by weight or less. The content of C3A can be determined from the Bogue equations.

The above-mentioned cement clinker is not especially limited as long as it contains C3A within the above-mentioned range. Specifically, cement clinkers belonging to sulfate resisting cement, moderate heat cement, and low heat cement defined in JIS, are preferable. Cement clinkers belonging to moderate heat cement and low heat cement are more preferable.

In the ultrafine particle grouting composition of the present invention, the above-mentioned ultrafine particle cement (A) contains blast furnace slag and gypsum.

The above-mentioned blast furnace slag is not especially limited, but one or two or more different slow cooling slags and water granulated slags are preferably used. Water granulated slags are more preferred in view of strength exhibition property. If the ultrafine particle cement contains Portland cement and gypsum, without containing the blast furnace slag, the cement has high hydration activity when mixed with water and therefore flocculates. Therefore, apparent coarsening of the particles may be generated. Use of the blast furnace slag makes it possible to ease the hydration activity at the time of mixing with water, and thereby reduce the aggregated particles in the ultrafine particle grouting composition. Therefore, the dispersion retainability is more improved and further medium to long term-strength exhibition property and durability are improved.

The above-mentioned gypsum is not especially limited, and gypsum dihydrate, hemihydrate gypsum, and anhydrous gypsums such as II type anhydrous gypsum and III type anhydrous gypsum are preferable. These may be chemical gypsums or natural gypsums or may be heat-treated. The II type anhydrous gypsum is preferable in terms of injectability and strength exhibition property.

If the above-mentioned gypsum is contained as a constitutional component, initial strength exhibition property, the hydration accelerated effects in medium to long term of the blast furnace slag can be obtained. The gypsum is an easily-pulverized material and easily segregated at the time of inter-grinding as in $3CaO.Al_2O_3$ (hereinafter, also referred to as C3A). Some gypsum has an activity depending on the kind. For example, hemihydrate gypsum is hardened by hydration for an extremely short time. The gypsum which rapidly reacts with C3A is preferably contained at a specific amount or less such that the ultrafine particle grouting composition can exhibit excellent injectability. The gypsum has a smaller density in comparison to other materials, and causes material segregation at the time of pressure injection. Therefore, a gypsum layer lack in adhesion may be formed if the ultrafine particle grouting composition containing a large amount of the gypsum is used as a grout.

It is preferable that the ultrafine particle cement (A) contained in the ultrafine particle grouting composition comprises 45 to 97% by weight of the blast furnace slag, 2 to 15% by weight of the gypsum, and 0 to 40% by weight of Portland cement. The total of the above-mentioned blast furnace slag, gypsum, and Portland cement is not necessarily 100% by weight although the total amount of the ultrafine particle cement (A) is 100% by weight.

If the content of the above-mentioned blast furnace slag is less than 45% by weight, the effect of easing the hydration activity of the Portland cement is insufficient, and the injectability of the ultrafine particle grouting composition may be reduced. If the content of the blast furnace slag is more than 97% by weight, the initial strength exhibition property is insufficient, possibly resulting in inadequacy for actual use. The content of the blast furnace slag is more preferably 50 to 95% by weight, and still more preferably 60 to 90% by weight.

If the content of the above-mentioned gypsum is less than 2% by weight, the initial strength exhibition property is reduced. If the content is more than 15% by weight, the gypsum reacts with C3A contained in Portland cement and generates ettringite. As a result, not only high injectability is not obtained, but also many gypsum layers are formed due to the material segregation, and uniform ground improvement effects may not be obtained. The content of the gypsum is more preferably 2 to 10% by weight, and still more preferably 2 to 5% by weight.

If the above-mentioned Portland cement is not contained (the content thereof is 0% by weight), the initial strength exhibition property is reduced. If the content of the Portland cement is more than 40% by weight, the Portland cement reacts with the gypsum, and thereby the amount of the ettringites generated increases. Therefore, high injectability may not be obtained. The content of the Portland cement is more preferably 5 to 40% by weight.

It is preferable that the ultrafine particle cement (A) contained in the ultrafine particle grouting composition has 30% by volume or less of particles having a particle diameter of 2 μm or less. If ultrafine particle cement (A) has a diameter of 2 μm or less, the aggregability is particularly accelerated. Therefore, the cement containing the above-mentioned amount of particles having the above-mentioned particle diameter is used as the ultrafine particle cement (A) (ultrafine particle grout), and thereby the composition can exhibit excellent injectability. If the above-mentioned ultrafine particle grouting composition contains more than 30% by volume of the particles having a particle diameter of 2 μm or less, apparent coarsening of the particles may cause reduction in the permeability (injectability).

Specific examples of the above-mentioned ultrafine particle cement (A) include Nittetsu Super Fine and Nittetsu Super Fine-L each produced by Nittetsu Cement Co., Ltd. The products of Nittetsu Cement Co., Ltd. may be used as the ultrafine particle cement (A) in the ultrafine particle grouting composition of the present invention because the products satisfy the above-mentioned particle conditions, that is, the products each have 10% by volume or less of particles having a particle diameter of 16 μm or more. Taiheiyo AROFIX MC and Taiheiyo AROFIX-MC No. 2 each produced by Taiheiyo Materials Corp.; Fine Hard produced by Mitsubishi Materials Corp.; Colloidal Super and Quick-setting Colloidal Super each produced by DENKI KAGAKU KOGYO K.K. also may exhibit the functional effects of the present invention as long as satisfying the above-mentioned particle diameter conditions and the like. The above-mentioned Nittetsu Super Fine is a composition containing blast furnace slag, gypsum, and cement. The composition has an average particle diameter of as small as 4 μm or less (about 3 μm) and has a narrow particle size distribution range, characteristically. The Nittetsu Super Fine is particularly preferable as the ultrafine particle cement (A) (ultrafine particle grout) because having such a particle size distribution range. Ultrafine particle grouts are used for ground improvement and water shutoff at the time of construction of barrage, tunnel, subway, waterworks and sewer, and the like, and can be permeated and injected into fine sand grounds or injected into fine cracks because of the small particle diameter and the narrow particle size distribution range. The Nittetsu Super Fine is particularly excellent in such performances needed for the ultrafine particle grouts, that is, injectability (permeability) into sand layers, injection (permeation) retainability after a lapse of a long time with a slurry form, and setting characteristics after injection.

The content of the above-mentioned ultrafine particle cement (A) is not especially limited, and preferably 95 to 99.95% by weight relative to 100% by weight of the ultrafine particle grouting composition. If the content is less than 95% by weight, the costs are increased, possibly resulting in economic inefficiency. If the content is more than 99.95% by weight, the ultrafine particle grouting composition may insufficiently exhibit the dispersibility and the dispersion retainability. The content is more preferably 97 to 99.9% by weight, and still more preferably 98 to 99.85% by weight, and particularly preferably 99 to 99.8% by weight.

The ultrafine particle grouting composition of the present invention may contain water. That is, the above-mentioned ultrafine particle grouting composition has an embodiment (1) in which the composition contains the ultrafine particle cement (A) and the polycarboxylic acid copolymer or an embodiment (2) in which the composition contains the ultrafine particle cement (A), the polycarboxylic acid copolymer, and water, and may contain one or two or more different other components mentioned below. In the embodiment (1), the composition may be in solid (powder) form. In the embodiment (2), the composition may be in various embodiments such as liquid (slurry) form, and such a composition is also referred to as "slurry for ultrafine particle cement grouts" or simply "slurry".

The above-mentioned water is not especially limited as long as the functional effects of the present invention are exhibited, and preferably water defined in Appendix 9 of JIS A 5308. Such water defined in Appendix 9 of JIS A 5308 has no adverse effects on performances of concrete, and drinking water and water other than the drinking water (river water, lake water, well water, groundwater, and the like) are specified. If water except for such water, for example, strong electrolyte such as sea water is used, aggregation of cement particles is accelerated, and thereby high injectability may not be obtained.

The content of the above-mentioned water is not especially limited as long as the functional effects of the present invention are exhibited, and may be approximately determined depending on the constitutional components or the application of the ultrafine particle grouting composition (ultrafine particle cement slurry). If the composition is used as a slurry grout to be injected into grounds and the like, for example, the ratio by weight of the water/the ultrafine particle cement (A) is preferably 80 to 10000%. If the ratio is less than 80%, the concentration of the ultrafine particle cement slurry is too high, and therefore the injection needs high pressure. If the ratio is more than 10000%, the concentration of the slurry is too low, and insufficient strength may be exhibited. The ratio is more preferably 90 to 5000%, and still preferably 100 to 2000%. The content of the ultrafine particle cement (A) when the above-mentioned slurry is injected into grounds is preferably 0.9 to 56% by weight relative to 100% by weight of the ultrafine particle grouting composition (ultrafine particle cement slurry). If the content is less than 0.9% by weight, the concentration of the ultrafine particle cement slurry is too low and therefore sufficient strength may not be exhibited. If the content is more than 56% by weight, the concentration of the slurry is too high, and therefore high pressure is needed for injection. The content is more preferably 1.9 to 53% by weight, and still more preferably 4 to 50% by weight.

The ultrafine particle grouting composition may contain, as long as the functional effects of the present invention are exhibited, in addition to the above-mentioned components, one or two or more species of: cement dispersants other than polycarboxylic acid cement dispersants; concrete admixtures such as AE agents, defoaming agents, hardening (setting) retardants, hardening (setting)accelerators, cement wetting agents, swelling agents, waterproof agents, quick setting agents, thickeners, aggregating agents, rapid hardening materials, shrinkage-reducing agents, segregation-reducing agents, neutralization preventing agents, rust-proofers; and other water-soluble polymer compounds, pozzolanic substances, clay minerals, foaming agents, bloating agents, and antifreezing agents. Additive agents and additive materials publicly known in cement and concrete fields may be used in combination.

Specific examples of the above-mentioned cement dispersants other than polycarboxylic acid cement dispersants include various sulfonic acid cement dispersants, for example, polyalkylarylsulfonate cement dispersants such as naphthalene sulfonic acid formaldehyde condensates, methylnaphthalene sulfonic acid formaldehyde condensates, and anthracene sulfonic acid formaldehyde condensates; melamine-formalin resin sulfonate cement dispersants such as melamine sulfonic acid formaldehyde condensates; aromatic amino sulfonate cement dispersants such as aminoaryl sulfonic acid-phenol-formaldehyde condensates; lignin sulfonate cement dispersants such as lignin sulfonate and modified lignin sulfonate; and polystyrene sulfonate cement dispersants.

Specific examples of the above-mentioned AE agents include sodium hydroxy stearate, lauryl sulfate, ABS (alkylbenzene sulfonate), LAS (linear alkylbenzene sulfonate), alkane sulfonate, polyoxyethylene alkyl(phenyl)ether, polyoxyethylene alkyl(phenyl)ether sulfate ester or salts thereof, polyoxyethylene alkyl(phenyl)ether phosphate or salts thereof, protein materials, alkenyl sulfosuccinic acid, α-olefin sulfonate.

In the ultrafine particle grouting composition of the present invention, various AE agents such as alkyl ether anionic surfactants, modified rosin acid compound anionic surfactants, alkyl sulfonic acid compound anionic surfactants, high alkyl carboxylate anionic surfactants, and modified alkyl carboxylic acid compound anionic surfactants, and Vinsol (trade name, product of YAMASO CHEMICAL CO., LTD.) or Micro-Air (trade name, product of Master Builders Inc.) may be used in combination.

Specific examples of the above-mentioned defoaming agents include polyoxyalkylene compounds such as (poly) oxyethylene (poly)oxypropylene adducts; polyoxyalkylene alkyl ethers such as diethylene glycol heptyl ether, polyoxyethylene oleyl ether, polyoxypropylene butyl ether, polyoxyethylene polyoxypropylene 2-ethyl hexyl ether, and oxyethylene oxypropylene adducts of higher alcohols containing 12 to 14 carbon atoms; acetylene ethers such as 2,4,7,9-tetramethyl-5-desine-4,7-diol, 2,5-dimethyl-3-hexyne-2,5-diol, and 3-methyl-1-butyn-3-ol; polyoxyalkylene sorbitan fatty acid esters such as polyoxyethylene sorbitan monolaurate and polyoxyethylene sorbitan trioleate; polyoxyalkylene alkylamines such as polyoxypropylene polyoxyethylene laurylamine (to which 1 to 20 mol of propylene oxides and 1 to 20 mol of ethylene oxides are added), and hydrogenated tallow amine to which alkylene oxides are added (1 to 20 mol of propylene oxides and 1 to 20 mol of ethylene oxides are added); and polyoxyalkylene amides. These defoaming agents may be used singly or in combination with two or more species of them. The antifoaming agent may be added before, during, or after the polymerization. The proportion of the added antifoaming agent is preferably 0.0001 to 10% by weight relative to the total weight of the polymer for ultrafine particle grouting compositions. That is, the proportion of the antifoaming agent is 0.0001 to 10% by weight relative to the polycarboxylic acid dispersant (C), and such an antifoaming agent may be previously added to the dispersant.

Specific examples of defoaming agents other than the above-mentioned oxyalkylene defoaming agents include mineral oil defoaming agents such as kerosine and liquid paraffin; fats and oils defoaming agents such as animal and vegetable oils, sesame oil, castor oil, and alkylene oxide adducts thereof; fatty acid defoaming agents such as oleic acid, stearic acid, and alkylene oxide adducts thereof; fatty acid ester defoaming agents such as glycerin monolisinolate, alkenyl succinic acid derivative, sorbitol monolaurate, sorbitol trioleate, and natural wax; alcohol defoaming agents such as octyl alcohol, hexadecyl alcohol, acetylene alcohol, and glycols; amide defoaming agents such as acrylate polyamine; phosphate defoaming agents such as tributyl phosphate and sodium octyl phosphate; metallic soap defoaming agents such as aluminum stearate and calcium oleate; and silicone defoaming agents such as dimethyl silicone oil, silicone paste, silicone emulsion, organic modified polysiloxane (polyorganosiloxanes such as dimethylpolysiloxane), and fluorosilicone oil.

Specific examples of the above-mentioned hardening (setting) accelerators include soluble calcium salts such as calcium chloride, calcium nitrite, calcium nitrate, calcium bromide, and calcium iodide; chlorides such as iron chloride and magnesium chloride; sulfates; potassium hydroxides; sodium hydroxides; carbonates; thiosulfates; formic acid and formates such as calcium formate; alkanolamine; alumina cement; and calcium aluminate silicate.

Specific examples of the above-mentioned water-soluble polymer compounds include nonionic cellulose ethers such as methylcellulose, ethylcellulose, hydroxymethylcellulose, hydroxyethylcellulose, carboxymethylcellulose, carboxyethylcellulose, and hydroxypropylcellulose; polysaccharide derivatives prepared by substituting hydrogen atoms of part or all of hydroxyl groups of alkylated or hydroxyalkylated derivatives of polysaccharides such as methylcellulose, ethylcellulose, hydroxyethylcellulose, and hydroxypropylcellulose, with hydrophobic substituents having a $C_{8-40}$ hydrocarbon chain as a partial structure and ionic hydrophilic substituents having a sulfonic acid group or salts thereof as a partial structure; polysaccharides produced by microbial fermentation such as yeast glucan, xanthane gum, and β-1,3 glucans (having a straight or branched chain, examples thereof include curdlan, paramylum, pachyman, scleroglucan, and laminaran); polyacrylamides; polyvinyl alcohols; starch; starch phosphate; sodium arginine; gelatin; and acrylic acid copolymers having an amino group in the molecule and quaternary compounds thereof.

The ultrafine particle grouting composition in accordance with the embodiment (i) of the present invention preferably contains the polycarboxylic acid copolymer having the repeating unit derived from the monomer represented by the above-mentioned formula (1) and the repeating unit derived from the monomer represented by the above-mentioned formula (2). Further, at least one or combination of the following embodiments (1) to (4) is more preferable as the embodiment of the composition.

(1) an embodiment in which the ultrafine particle cement (A) contained in the ultrafine particle grouting composition comprises 45 to 97% by weight of the blast furnace slag, 2 to 15% by weight of the gypsum, and 0 to 40% by weight of Portland cement.

(2) an embodiment in which the ultrafine particle cement (A) contained in the ultrafine particle grouting composition has 30% by volume or less of particles having a particle diameter of 2 μm or less.

(3) an embodiment in which a ratio (Y)/(X) of a molar number (Y) of the monomer represented by the formula (2) to a molar number (X) of the monomer represented by the formula (1) is 2.5 or more in the above-mentioned polycarboxylic acid copolymer.

(4) an embodiment in which the r in the monomer represented by the formula (1) is an integer of 2 to 100 in the above-mentioned polycarboxylic acid copolymer.

As a result, the functional effects of the present invention can be more sufficiently exhibited.

One embodiment of the ultrafine particle grouting composition of the present invention is an embodiment in which an ultrafine particle grouting composition comprising ultrafine particle cement (B) and a polycarboxylic acid dispersant (D), wherein (ii) the ultrafine particle cement (B) comprises $(a)_2$ to 25% by weight of cement clinker containing 5% by weight or less of $3CaO.Al_2O_3$, (b) 74 to 97% by weight of blast furnace slag, and (c) 1 to 5% by weight of gypsum, and the ultrafine particle cement (B) has 60 to 80% by volume of particles having a particle diameter of 1 to 5 μm in powder form of the cement.

Hereinafter, preferable embodiments in the above-mentioned embodiment (ii) are mentioned in detail. The embodiment (ii) and the preferable embodiments in the embodiment (ii) are preferably applied also to the above-mentioned embodiment (i).

The ultrafine particle grouting composition of the present invention is preferably a super ultrafine particle grouting composition. That is, it is preferable that the above-mentioned polycarboxylic acid dispersant (D) is used for a super ultrafine particle grout. In addition, such a super ultrafine particle grouting composition is in various embodiments such as solid (powder) and liquid (slurry). Such a composition is generally used as a super ultrafine particle grouting composition containing, as essential components, super ultrafine particle cement, the polycarboxylic acid dispersant (D), and water. In this case, the composition is in a slurry form, and such a slurry is also referred to as "slurry for super ultrafine particle cement grouts" or simply "slurry".

The super ultrafine particle grouting composition of the present invention contains, as essentially components, super ultrafine particle cement having specific constitutional components at specific proportions, and the polycarboxylic acid dispersant (D).

In the present invention, the above-mentioned super ultrafine particle cement means cement having 60 to 80% by volume of particles having a particle diameter of 1 to 5 μm in powder form of the cement. As mentioned above, the constitutional components and the proportions are specified in the ultrafine particle cement (B) used in the super ultrafine particle grouting composition in accordance with the above-mentioned embodiment (ii) of the present invention. The super ultrafine particle grouting composition obtained can exhibit excellent injectability if containing the cement having the above-mentioned amount of the particles having the above-mentioned particle diameter. The super ultrafine particle cement satisfying the above-mentioned range of 60 to 80% by volume of particles having a particle diameter of 1 to 5 μm in powder form of the cement is composed of highly pulverized powders in comparison to conventional ultrafine particle cement, and has a particle size which can be industrially produced. If the amount of the particles having a particle diameter of 1 to 5 μm is less than 60% by volume in the above-mentioned ultrafine particle cement (B) in powder form, the cement has a particle size equivalent to that of conventional ultrafine particle cement, and therefore excellent injectability may be insufficiently exhibited. It may be industrially difficult for the cement to have more than 80% by volume of particles having a particle diameter of 1 to 5 μm because, in current production technologies, there are limits to remove particles with 1 μm or less. Therefore, the upper limit is 80% by volume. The amount of the particles having a particle diameter of 1 to 5 μm is more preferably 60 to 75% by volume, and still more preferably 65 to 75% by weight.

The above-mentioned particle amount is preferably measured by subjecting the cement to treatment for three minutes by an ultrasonic washing machine (output 40 W, frequency 40 kHz) using ethanol as a dispersion medium.

The above-mentioned particle amount represents a particle amount of particles contained in the ultrafine particle cement, the particles having a particle diameter of 1 to 5 μm. The amount of the particles having a particle diameter of 1 to 5 μm in the ultrafine particle cement in powder form can be measured using Laser Diffraction Particle Size Analyzer (product of Shimazu Corp., SALD-2000J, a refractive index of 1.70±0.20i). Thus-measured amount of the particle with a diameter of 1 to 5 μm in powder form of the cement is 60 to 80% by volume.

In the ultrafine particle grouting composition in accordance with the embodiment (ii) of the present invention, the above-mentioned cement clinker contains 5% by weight or less of $3CaO.Al_2O_3$ (also referred to as C3A) relative to 100% by weight of the cement clinker for sufficient exhibition of the functional effects of the present invention. If the content of the C3A is 5% by weight or less, the ultrafine particle grouting composition has sufficiently excellent injectability, and particularly has excellent initial injectability. The content of the C3A is more preferably 2 to 5% by weight, and still more preferably 3 to 5% by weight. The content of C3A can be determined from the Bogue equations.

The above-mentioned cement clinker of the present invention contains, as a main mineral, $3CaO.SiO_2$, $2CaO.SiO_2$, $3CaO.Al_2O_3$ (also referred to as C3A), and $4CaO.Al_2O_3.Fe_2O_3$. The cement clinker has hydration activity and grindability each largely varying depending on the content of these minerals. The content of these minerals is not especially limited as long as the functional effects of the present invention are exhibited. A larger amount of dispersants is adsorbed to the C3A, among these minerals, in comparison to the other minerals. Therefore, reduction in the C3A content enables for the initial dispersant concentration in a slurry to be kept high, and the ultrafine particle grouting composition can have high dispersion retainability. It is known that the C3A has high initial hydration property and therefore not only accelerates aggregation of the particles but also reacts with the gypsum rapidly to generate ettringite ($3CaO.Al_2O_3.3CaSO_4.32H_2O$) as an initial hydrate that inhibits the injection. The C3A is segregated to the fine particles side at the time of pulverization. If the cement clinker is more finely pulverized, the number of ultrafine C3A particles remarkably increases and thereby the ultrafine particle grouting composition may insufficiently exhibit high dispersibility and high dispersion retainability. Therefore, the content of the C3A is preferably reduced.

The above-mentioned cement clinker is not especially limited as long as it contains C3A within the above-mentioned range. Specifically, cement clinkers belonging to sulfate resisting cement, moderate heat cement, or low heat cement defined in JIS are preferable. Cement clinkers belonging to moderate heat cement and low heat cement are more preferable.

In the ultrafine particle grouting composition of the present invention, the content of the above-mentioned cement clinker is within a range of 2 to 25% by weight relative to 100% by weight of the ultrafine particle cement. For example, even if the cement contains C3A-reduced cement clinker containing 5% by weight or less of C3A, increase in the content of the cement clinker increases the C3A content in the ultrafine particle cement. Therefore, it is effective for improvement in injectability to limit the content of the cement clinker and extremely reduce the C3A content in the ultrafine particle cement. If the content of the above-mentioned cement clinker is 25% by weight or less, increase in aggregated particles is not caused with increase in the C3A content in the ultrafine particle cement. Thereby, the ultrafine particle grouting composition can more sufficiently exhibit excellent injectability. If the content of the cement clinker is less than 2% by weight, the composition has poor strength exhibition property and therefore may not be useful. The content of the cement clinker is more preferably 5 to 25% by weight, and still more preferably 5 to 20% by weight.

In the ultrafine particle grouting composition of the present invention, the content of the above-mentioned blast furnace slag is 74 to 97% by weight relative to 100% by weight of the ultrafine particle cement. If the content of the blast furnace slag is 74% by weight or more, the effect of easing the hydration activity of the cement clinker is sufficient, and therefore the ultrafine particle grouting composition can exhibit excellent injectability. If the content of the blast furnace slag is more than 97% by weight, the initial strength exhibition property is insufficient, possibly resulting in inadequacy for actual use. The content of the blast furnace slag is more preferably 74 to 95% by weight, and still more preferably 77 to 92% by weight for sufficient exhibition of the functional effects of the present invention.

The above-mentioned blast furnace slag is not especially limited in the ultrafine particle grouting composition of the present invention, but one or two or more different slow cooling slags and water granulated slags are preferably used. Water granulated slags are more preferred in view of strength exhibition property. If the ultrafine particle cement contains cement clinker and gypsum, without containing the blast furnace slag, the cement has high hydration activity when mixed with water and therefore aggregates. Therefore, apparent coarsening of the particles may be generated. Use of the blast furnace slag makes it possible to ease the hydration activity at the time of mixing with water, and thereby reduce the aggregated particles in the ultrafine particle grouting composition. Therefore, the dispersion retainability is more improved and further medium to long term-strength exhibition property and durability are improved.

In the ultrafine particle grouting composition of the present invention, the content of the above-mentioned gypsum is within a range of 1 to 5% by weight relative to 100% by weight of the ultrafine particle cement. If the content of the gypsum is less than 1% by weight, the initial strength exhibition property is reduced. If the content of the gypsum is more than 5% by weight, the gypsum reacts with C3A and thereby an amount of ettringite generated is increased. Therefore, not only high injectability is not obtained, but also many gypsum layers are formed due to the material segregation and uniform ground improvement effects may not be obtained. The content of the gypsum is more preferably 1 to 4% by weight, and still more preferably 2 to 4% by weight.

In the ultrafine particle grouting composition of the present invention, the above-mentioned gypsum is not especially limited, and gypsum dihydrate, hemihydrate gypsum, and anhydrous gypsums such as II type anhydrous gypsum and III type anhydrous gypsum are preferable. These may be chemical gypsums or natural gypsums or may be heat-treated. The II type anhydrous gypsum is preferable in terms of injectability and strength exhibition property.

If the above-mentioned gypsum is contained as a constitutional component, the initial strength exhibition property, the hydration accelerated effects in medium to long term of the blast furnace slag can be obtained. The gypsum is an easily-pulverized material and easily segregated at the time of intergrinding as in C3A. Some gypsum has an activity depending on the kind. For example, hemihydrate gypsum is hardened by hydration for an extremely short time. The gypsum which rapidly reacts with C3A is preferably contained at a specific amount or less such that the ultrafine particle grouting composition can exhibit excellent injectability. The gypsum has a smaller density in comparison to other materials, and causes material segregation at the time of pressure injection. Therefore, a gypsum layer lack in adhesion may be formed if the ultrafine particle grouting composition containing a large amount of the gypsum is used as a grout.

The content of the above-mentioned ultrafine particle cement used in the above-mentioned embodiment (ii) of the present invention is not especially limited, and preferably 95 to 99.7% by weight on solids content equivalent basis relative to 100% by weight of the ultrafine particle grouting composition. If the content is less than 95% by weight, the costs are increased, possibly resulting in economic inefficiency. If the content is more than 99.7% by weight, the ultrafine particle grouting composition may insufficiently exhibit the dispersibility and the dispersion retainability. The content is more preferably 96 to 99.5% by weight, and still more preferably 97 to 99% by weight.

The polycarboxylic acid dispersant (D) used in the above-mentioned embodiment (ii) of the present invention is not especially limited as long as it exhibits the functional effects of the present invention. Dispersants used in cement and concrete fields and commercially available water-reducing agents for cement and concrete are preferable, for example. Among the commercially available water-reducing agents for cement and concrete, dispersants preferably used in the present invention include those referred to as polycarboxylic acid cement dispersants or polycarboxylic acid cement water-reducing agents each containing a polycarboxylic acid copolymer as an essential component of the cement dispersants. Such polycarboxylic acid cement dispersants are known to exhibit high dispersibility and high dispersion retainability attributed to steric hindrance in use of a small amount. In the polycarboxylic acid dispersants, the polycarboxylic acid copolymer has a free carboxyl group and exhibits water-reducing performances for the cement composition. One or two or more different polycarboxylic acid copolymers may be used, and polycarboxylic acid copolymers having a polyalkylene glycol in a side chain are preferable. If the copolymer has a polyalkylene glycol in a side chain, it is known that the dispersibility and the dispersion retainability vary depending on the length of the main chain, the length of the side chain, the carboxylic acid amount, and the like.

The above-mentioned polycarboxylic acid cement dispersants used in the cement and concrete fields may be preferably used in the ultrafine particle grouting composition in accordance with the embodiment (ii) of the present invention, and can exhibit high dispersibility and high dispersion retainability also for the ultrafine particle cement, in comparison to other dispersants.

The polycarboxylic acid copolymer contained in the polycarboxylic acid dispersant (D) of the present invention, as in the above-mentioned cement dispersants, has a free carboxyl group and exhibits dispersion performances for the ultrafine particle cement and enables the ultrafine particle grouting composition to have excellent dispersibility (permeation) and dispersion retainability. One or two or more different polycarboxylic acid copolymers may be used, but such polycarboxylic acid copolymers preferably have a polyalkylene glycol in a side chain. That is, it is preferable that the above-mentioned polycarboxylic acid dispersant (D) comprises a repeating unit derived from an unsaturated polyalkylene glycol monomer and a repeating unit derived from an unsaturated carboxylic acid monomer. Thus, the preferable embodiments of the present invention include the ultrafine particle grouting composition, wherein the polycarboxylic acid dispersant (D) comprises a polycarboxylic acid copolymer having a repeating unit derived from an unsaturated polyalkylene glycol monomer and a repeating unit derived from an unsaturated carboxylic acid monomer.

It is preferable that the above-mentioned polycarboxylic acid copolymer has a long side chain. The ultrafine particle grouting composition containing such a copolymer-containing polycarboxylic acid dispersant (D) can be excellent in dispersibility (permeability) and dispersion retainability. The chain length of the side chain, and the dispersibility and the dispersion retainability are conceptually explained below. If the side chain is long, the steric hindrance easily occurs, and therefore it is difficult for ultrafine cement particles to which the polycarboxylic acid copolymers has adsorbed to approach to each other. As a result, the composition is excellent in dispersibility. When adsorbed to surfaces of specific ultrafine cement particles, the polycarboxylic acid copolymers are difficult to approach each other due to the steric hindrance. Therefore, it can be suppressed that the polycarboxylic acid copolymers excessively cover the ultrafine cement particles. Therefore, it can be secured enough that the ultrafine cement particles are brought into contact with water, and thereby hydration is allowed to proceed, the setting is completed for a short time, resulting in shorter hardening time.

If the copolymer has a short chain, the steric hindrance are difficult to occur, and therefore the polycarboxylic acid copolymer covers the ultrafine cement particles and the hydration of the ultrafine cement particles is prevented, which may extend the time required for setting. As mentioned above, the polycarboxylic acid copolymer contained in the polycarboxylic acid dispersant (D) preferably has a long side chain because the dispersibility and the dispersion retainability can be excellent. The above-mentioned polycarboxylic acid copolymer is mentioned below.

The dosage of the above-mentioned polycarboxylic acid dispersant (D) is not especially limited, but is preferably 0.3 to 5.0% by weight on solids content equivalent basis, relative to 100% by weight of the ultrafine particle cement. If the dosage is less than 0.3% by weight, the ultrafine particle grouting composition may insufficiently exhibit the dispersibility and the dispersion retainability. If the dosage is more than 5% by weight, the dosage is too large and the costs increase, resulting in economic inefficiency. The dosage is more preferably 0.5 to 4.0% by weight, and still more preferably 1.0 to 3.0% by weight.

The above-mentioned ultrafine particle grouting composition contains, as essential components, the ultrafine particle cement and the polycarboxylic acid dispersant (D), but generally contains water, as mentioned above. Such water, the ratio by weight of the water/the ultrafine particle cement (B) in the ultrafine particle grouting composition (ultrafine particle cement slurry), and the content of the ultrafine particle cement (B) are not especially limited as long as the functional effects of the present invention are exhibited. The preferable embodiments of the water, the ratio by weight of the water/the ultrafine particle cement (A) in the ultrafine particle grouting composition (ultrafine particle cement slurry), and the content of the ultrafine particle cement (A) in accordance with the above-mentioned (i) are preferably applied.

The ultrafine particle grouting composition of the present invention may contain, in addition to the above-mentioned components, one or two or more species of: cement dispersants other than polycarboxylic acid cement dispersants; concrete admixtures such as AE agents, defoaming agents, hardening (setting) retardants, hardening (setting) accelerators, cement wetting agents, swelling agents, waterproof agents, quick setting agents, thickeners, aggregating agents, rapid hardening materials, shrinkage-reducing agents, segregation-reducing agents, neutralization preventing agents, anticorrosives; and other water-soluble polymer compounds, pozzolanic substances, clay minerals, foaming agents, bloating agents, and antifreezing agents. Additive agents and additive materials publicly known in cement and concrete fields may be used in combination. As specific examples of these agents, the same specific examples as in the above-mentioned embodiment (i) may be mentioned. As preferable use embodiments of these agents, the preferable embodiments in the above-mentioned embodiment (i) can be preferably applied.

In the ultrafine particle grouting composition of the present invention, the preferable embodiments of the present invention include a slurry containing: ultrafine particle cement being composed of highly-pulverized powders containing (a) 2 to 25% by weight of cement clinker containing 5% by weight or less of $3CaO.Al_2O_3$, (b) 74 to 97% by weight of blast furnace slag, and (c) 1 to 5% by weight of gypsum and having 60 to 80% by volume of particles having a particle diameter of 1 to 5 μm in powder form of the cement; the polycarboxylic acid dispersant (D); and water. As mentioned above, if the mixing proportions of the cement clinker containing reduced C3A having high hydration activity, the blast furnace slag and the gypsum are specified, and the polycarboxylic acid dispersant (D) and the water are contained, the aggregation of particles in the slurry can be reduced as much as possible even if the cement is pulverized to have a particle size smaller than that of conventional ultrafine particle cement. Therefore, such an ultrafine particle grouting composition can exhibit injectability higher than that of conventional ultrafine particle grouting composition.

Hereinafter, the polycarboxylic acid copolymer contained in the polycarboxylic acid dispersant (D) in accordance with the above-mentioned embodiment (ii) of the present invention is mentioned in detail.

The above-mentioned polycarboxylic acid copolymer is not especially limited as long as it exhibits dispersion performances and dispersion retainability performances for the particles contained in the ultrafine particle grouting composition. A polycarboxylic acid copolymer having a polyalkylene glycol in a side chain is preferably used. Such a polycarboxylic acid copolymer is contained, as an essential component, in the ultrafine particle grouting composition.

The above-mentioned polycarboxylic acid copolymer having a polyalkylene glycol in a side chain preferably has a repeating unit derived from an unsaturated polyalkylene glycol monomer and a repeating unit derived from an unsaturated carboxylic acid monomer.

It is more preferable that the above-mentioned polycarboxylic acid copolymer contains a polycarboxylic acid copolymer having the repeating unit derived from the monomer represented by the above formula (1) and the repeating unit derived from the monomer represented by the above formula (2).

The above-mentioned polycarboxylic acid copolymer preferably is a polycarboxylic acid copolymer (P-3) containing:

a polyoxyalkylene ester constitutional unit (VI) represented by the following formula (7):

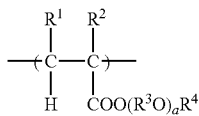
(7)

(in the formula, $R^1$ and $R^2$ being the same or different and each representing a hydrogen atom or a methyl group; $R^3O$ being the same or different and representing an oxyalkylene group containing 2 to 18 carbon atoms; a representing an average molar number of addition of the oxyalkylene group and being an integer of 2 to 300; $R^4$ representing a hydrogen atom or a hydrocarbon group containing 1 to 30 carbon atoms); and a carboxylic acid constitutional unit (VII) represented by the following formula (8):

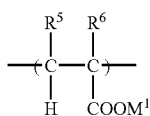
(8)

(in the formula, $R^5$ and $R^6$ being the same or different and each representing a hydrogen atom or a methyl group; $M^1$ representing a hydrogen atom, a monovalent metal, a divalent metal, ammonium group, or an organic amine group).

The above-mentioned polycarboxylic acid copolymer preferably is a polycarboxylic acid copolymer (P-4) containing:

a polyoxyalkylene ether constitutional unit (VIII) represented by the following formula (9):

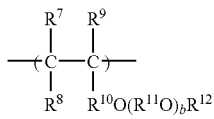
(9)

(in the formula, $R^7$, $R^8$, and $R^9$ being the same or different and each representing a hydrogen atom or a methyl group; $R^{10}$ representing a hydrocarbon group containing 1 to 5 carbon atoms; $R^{11}O$ being the same or different and representing an oxyalkylene group containing 2 to 18 carbon atoms; b representing an average molar number of addition of the oxyalkylene group and being the number of 2 to 300; $R^{12}$ representing a hydrogen atom or a hydrocarbon group containing 1 to 30 carbon atoms); and a carboxylic acid constitutional unit (IX) represented by the following formula (10):

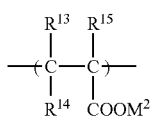
(10)

(in the formula, $R^{13}$ and $R^{14}$ being the same or different, and each representing a hydrogen atom, a methyl group, or —COOM$^3$, but not representing —COOM$^3$ simultaneously; $R^{15}$ representing a hydrogen atom, a methyl group, or —CH$_2$COOM$^4$; $R^{13}$ and $R^{14}$ being the same or different and each representing a hydrogen atom or a methyl group when $R^{15}$ being —CH$_2$COOM$^4$; $M^2$, $M^3$, and $M^4$ each representing a hydrogen atom, a monovalent metal, a divalent metal, ammonium group, and an organic amine group).

That is, the above-mentioned polycarboxylic acid dispersant (D) preferably contains the above-mentioned polycarboxylic acid copolymer (P-3) and/or the above-mentioned polycarboxylic acid copolymer (P-4). Such a polycarboxylic acid dispersant (D) may contain only the above-mentioned polycarboxylic acid copolymer (P-3) and/or the above-mentioned polycarboxylic acid copolymer (P-4), may contain other components, and preferably mainly contains the above-mentioned polycarboxylic acid copolymer (P-3) and/or the above-mentioned polycarboxylic acid copolymer (P-4). Each of the above-mentioned polycarboxylic acid copolymers (P-3) and (P-4) has the above-mentioned essential constitutional units (repeating units), and may further contain a constitutional unit (X) derived from a monomer (j) mentioned below. One or two or more different these constitutional units may be contained in the copolymers.

The above-mentioned polycarboxylic acid copolymer (P-3) can be produced by copolymerizing a monomer component essentially containing a monomer providing the constitutional unit (VI) (for example, a monomer (f) mentioned below) and a monomer providing the constitutional unit (VII) (for example, a monomer (g) mentioned below). Such a monomer component may further contain a monomer providing the constitutional unit (X) (for example, a monomer (j) mentioned below). If one species is used as each of the constitutional units, one species of the monomer providing the constitutional unit may be used. If two or more species are used as each of the constitutional units, two or more species of the monomer providing the constitutional unit may be used.

With the ratio between the constitutional units constituting the above-mentioned polycarboxylic acid copolymer (P-3), the constitutional unit (VI)/the constitutional unit (VII)/the constitutional unit (X) is preferably 1 to 99/99 to 1/0 to 50 at a ratio by weight. The constitutional unit (VI)/the constitutional unit (VII)/the constitutional unit (X) is more preferably 50 to 99/50 to 1/0 to 49, and still more preferably 60 to 95/40 to 5/0 to 30, and most preferably 65 to 90/35 to 10/0 to 10. The total of the constitutional unit (VI), the constitutional unit (VII), and the constitutional unit (X) is 100% by weight.

The above-mentioned polycarboxylic acid copolymer (P-3) may be produced by directly esterifying at least part of carboxyl groups of a polymer obtained by polymerizing a monomer component essentially containing a monomer providing the constitutional unit (VII) (for example, a monomer (g) mentioned below), with an alkoxypolyalkylene glycol. In the above formula (7), examples of the hydrocarbon group containing 1 to 30 carbon atoms in $R^4$ specifically include $C_{1-30}$ alkyl groups, $C_{6-30}$ benzene ring-containing aromatic groups, such as phenyl groups, alkylphenyl groups, phenylalkyl groups, phenyl groups substituted with (alkyl)phenyl group, naphthyl groups and $C_{2-30}$ alkenyl groups. The molar number of addition of the oxyalkylene group a is the number of 2 to 300, and preferably 5 to 300, and more preferably 10 to 250, and still more preferably 20 to 200, and most preferably 50 to 100. Further, the number of carbon atoms of $R^4$ is preferably 1 to 22, and more preferably 1 to 18, and still more preferably 1 to 12, and particularly preferably 1 to 6, and still particularly preferably 1 to 5, and most preferably 1 to 3.

The number of carbon atoms of the oxyalkylene group $R^3O$ in the above formula (7) is suitably 2 to 18, and preferably 2 to 8, and more preferably 2 to 4. If the copolymer contains one species of the constitutional unit (VI), it is preferable that the copolymer essentially contains an oxyethylene group in the oxyalkylene group for securing the balance between hydrophilicity and hydrophobicity. The oxyethylene group preferably accounts for 50% by mol or more, and particularly preferably 60% by mol or more. If the copolymer contains two or more species of the constitutional unit (VI), it is preferable that the copolymer essentially contains an oxyethylene group in the oxyalkylene group of any one species of the constitutional unit (VI).

The specific examples of the monomer (a) exemplified in the above-mentioned embodiment (i) may be mentioned as specific examples of the above-mentioned monomer (f) providing the constitutional unit (VI). Further, as the above-mentioned monomer (f), the ester compounds of (meth) acrylic acid or crotonic acid with alkoxypolyalkylene glycols, which corresponds to the case where $R^4$ is a hydrocarbon group in the formula (7), are preferable.

Examples of the above-mentioned monomer (g) providing the constitutional unit (VII) represented by the above formula (8) include acrylic acid, methacrylic acid, crotonic acid and metal salts thereof, ammonium salts thereof, and amine salts thereof. (Meth)acrylic acid and salts thereof are particularly preferable. The above-mentioned polycarboxylic acid copolymer (P-4) can be produced by copolymerizing a monomer component essentially containing a monomer providing the constitutional unit (VIII) (for example, a monomer (h) mentioned below), and a monomer providing the constitutional unit (IX) (for example, a monomer (i) mentioned below). Such a monomer component may further contain a monomer providing the constitutional unit (X) (for example, a monomer (j) mentioned below).

With the ratio between the constitutional units constituting the above-mentioned polycarboxylic acid copolymer (P-4), the constitutional unit (VIII)/the constitutional unit (IX)/the constitutional unit (X) is preferably 1 to 99/99 to 1/0 to 50 at a ratio by weight. The constitutional unit (VIII)/the constitutional unit (IX)/the constitutional unit (X) is more preferably 50 to 99/50 to 1/0 to 49, and still more preferably 60 to 95/40 to 5/0 to 30, and most preferably 65 to 90/35 to 10/0 to 10. The total of the constitutional unit (VIII), the constitutional unit (IX), and the constitutional unit (X) is 100% by weight.

The above-mentioned polycarboxylic acid copolymer (P-4) also can be produced by adding an average of 2 to 300 mol of alkylene oxides into polymers obtained by copolymerizing a monomer component essentially containing an unsaturated alcohol such as allyl alcohol, methallyl alcohol, 3-methyl-3-butene-1-ol, 3-methyl-2-butene-1-ol, and 2-methyl-3-butene-2-ol with a monomer providing the constitutional unit (IX) (for example, a monomer (i) mentioned below) per 1 mol of unsaturated alcohol used in copolymerization, in other words, 1 mol of unsaturated alcohol constitutional unit in polymers or by reacting the polymer with an alkoxypolyalkylene glycol into which an average 2 to 300 mol of oxyalkylene groups are added per 1 mol of alkoxypolyalkylene glycols. In the above formula (9), the average molar number of addition of the oxyalkylene group b is the number of 2 to 300, and preferably 5 to 300, and more preferably 10 to 250, and still more preferably 20 to 200, and particularly preferably 50 to 100. $R^{12}$ is preferably a hydrogen atom. If $R^{12}$ is a hydrocarbon group, the number of carbon atoms is preferably 1 to 22, and more preferably 1 to 18, and still more preferably 1 to 12, and particularly preferably 1 to 6, and still particularly preferably 1 to 5, and most preferably 1 to 3. Further, the number of carbon atoms of $R^{10}$ is 1 to 5, and preferably 1 to 4, and more preferably 1 to 3, and particularly preferably —$CH_2$—, —$(CH_2)_2$—, or —$C(CH_3)_2$—.

The number of carbon atoms of the oxyalkylene group $R^{11}O$ in the above formula (9) is suitably 2 to 18, and preferably 2 to 8, and more preferably 2 to 4. If the copolymer contains one species of the constitutional unit (II), it is preferable that the copolymer essentially contains an oxyethylene group in the oxyalkylene group for securing the balance between hydrophilicity and hydrophobicity. The oxyethylene group preferably accounts for 50% by mol or more, and particularly preferably 60% by mol or more. Examples of the monomer (i) providing the constitutional unit (IX) represented by the formula (10) include unsaturated monocarboxylic acid monomers such as acrylic acid, methacrylic acid, crotonic acid and metal salts thereof, ammonium salts thereof, and amine salts thereof; unsaturated dicarboxylic acid monomers such as maleic acid, itaconic acid, citraconic acid, fumaric acid or metal salts thereof, ammonium salts thereof, and amine salts thereof. Anhydrides thereof also may be used, and for example, maleic anhydride, itaconic anhydride, citraconic anhydride may be mentioned. Particularly, (meth)acrylic acid, maleic acid, maleic anhydride, and salts thereof are preferably used.

Specific examples of the monomer (j) providing the constitutional unit (X) which can be used in the present invention is not especially limited as long as it is copolymerizable with at least one of the other monomers. For example, the specific examples of the above-mentioned monomer (e) exemplified in the above-mentioned embodiment (i) may be mentioned.

The present invention also is a production method of the ultrafine particle grouting composition, wherein the production method comprises a high-speed stirring step of performing mixing and stirring at a peripheral speed of 314 m/min or more. In accordance with one preferable embodiment of the present invention, the production method includes a high-speed stirring step of performing mixing and stirring at 2500 rpm or more. If the production method includes the above-mentioned high-speed stirring step, the ultrafine particle grouting composition preferably used in various applications such as grouts can be produced.

The above-mentioned production method of the ultrafine particle grouting composition can be preferably applied to a production method of the ultrafine particle grouting composition of the present invention. More preferably, the above-mentioned production method of the ultrafine particle grouting composition is used as a production method of the ultrafine particle grouting composition according to the above-mentioned embodiment (ii). Still more preferably, the above-mentioned production method of the ultrafine particle grouting composition is a production method of the ultrafine particle grouting composition.

The preferred embodiments of the production method of the ultrafine particle grouting composition according to the present invention include a production method of an ultrafine particle grouting composition comprising ultrafine particle cement, a polycarboxylic acid dispersant, and water, wherein the production method comprising a high-speed stirring step of performing mixing and stirring at a peripheral speed of 314 m/min or more. The preferable embodiments also include an embodiment in which the production method includes a high-speed stirring step of performing mixing and stirring at 2500 rpm or more.

The above-mentioned peripheral speed means a peripheral speed of ends of stirring blades.

The above-mentioned peripheral speed can be measured from the following formula:

Peripheral speed (m/min)=Diameter of blade (m)×π× Stirring rotation number (rpm)

In the above-mentioned production method, the above-mentioned components are preferably used as the components (the ultrafine particle cement, the polycarboxylic acid dispersant, the water, and the like) contained in the ultrafine particle grouting composition. Hereinafter, the high-speed stirring step-including production method of the ultrafine particle grouting composition is also referred to as high-speed stirring method.

In the present invention, the high-speed stirring is performed under the above-mentioned conditions. As a result, shearing action by high-speed rotation of a mixer sufficiently breaks the aggregated primary or secondary particles of ultrafine particle cement, and the dispersant is adsorbed to newly appearing particle surfaces. Accordingly, ultrafine particle grouting compositions having high dispersibility and high dispersion retainability can be obtained. In contrast, if the ultrafine particle cement, the polycarboxylic acid dispersant, and water are mixed by a common production method, the above-mentioned ultrafine particle grouting composition (slurry for ultrafine particle cement grouts) having excellent dispersibility and dispersion retainability may not be obtained because the aggregation rate of the particles often exceeds the adsorption rate of the dispersant. For example, depending on the production method, the obtained slurry may be inferior in injectability to conventional ultrafine particle cement.

If the above-mentioned high-speed stirring step is performed at a peripheral speed of less than 314 m/min, the dispersion of the ultrafine cement particles is insufficient, possibly resulting in reduction in injectability of the ultrafine particle grouting composition. The high-speed stirring step at less than 2500 rpm also may cause the same results. The above-mentioned high-speed stirring step is more preferably performed at a peripheral speed of 376.8 m/min or more, and also preferably at 3000 rpm or more. The upper limit of the stirring speed in the high-speed stirring step is not especially limited, but practically preferably 1884 m/min or less, and also preferably 12000 rpm or less. Remarkable improvement effect is not observed in injectability even at a peripheral speed of more than 1884 m/min, and therefore costs on facilities may be increased. The stirring at more than 12000 rpm also may cause the same results. The peripheral speed is more preferably 1570 m/min or less, and also preferably 10000 rpm or less. The peripheral speed is preferably within a range of 314 to 1884 m/min, and also preferably within 2500 to 12000 rpm. In the above-mentioned high-speed stirring step, the mixing and stirring speed can be determined depending on the rotation number of a stirring axis of a high-speed mixer.

The high-speed mixer used in the above-mentioned high-speed stirring step is not especially limited, but a high-speed mixer having a stirring axis and a stirring blade is preferable. Specifically, one or two or more different high-speed mixers such as multipurpose digital mixer (product of Iuchi Seieido Co., Ltd., the maximum rotation number of the stirring axis of 5000 rpm, the diameter of the stirring blade of 40 mm) and Blender (product of Oster Corp., the maximum rotation number of the stirring axis of 15700 rpm, the diameter of the stirring blade of 50 mm) may be used. The above-exemplified high-speed mixers are testing mixers preferably used for stirring a small amount of materials. If the ultrafine particle grouting composition is injected into grounds or rocks, an appropriate high-speed mixer may be used depending on scale of use of the composition.

The stirring time in the above-mentioned high-speed stirring step can be appropriately determined depending on various conditions such as an application of produced ultrafine particle grouting compositions, a kind or an amount of raw materials, a mixer to be used, and a temperature at the time of stirring. For example, the stirring is preferably performed for 1 to 10 minutes if the ultrafine particle grouting composition is used as a grout, and as the raw material, ultrafine particle cement composed of highly pulverized powders containing cement clinker, blast furnace slag and gypsum is used.

In the above-mentioned high-speed stirring step, it is preferable that the stirring is performed at the above-mentioned stirring speed in the production method of the ultrafine particle grouting composition essentially containing the ultrafine particle cement, the polycarboxylic acid dispersant and water. These components is not especially limited as long as present when subjected to high-speed stirring at the above-mentioned stirring speed. The order or method of addition is not especially limited. If a liquid dispersant is used, an embodiment (1) in which the cement is added to a dispersant solution (water+dispersant) is preferable. If a powder dispersant is used, an embodiment (2) in which the cement is added to a solution prepared by adding the dispersant in powder form to the water, and an embodiment (3) in which the water is added to a mixture of the cement and the dispersant are preferable. As mentioned above, the above-mentioned polycarboxylic acid dispersant may be in liquid or powder form. The state may be approximately determined depending on various conditions.

The embodiment (1) is preferable among the above-mentioned embodiments (1) to (3) as the addition and mixing embodiment of the above-mentioned components because homogeneous slurry can be easily obtained without aggregation.

The present invention also is a production method of the ultrafine particle grouting composition, wherein the production method comprises a step of: mixing and stirring ultrafine particle cement and water; adding water; and performing stirring again.

In the above-mentioned production method, ultrafine particle cement and water as essential components are subjected to mixing and stirring (hereinafter, also referred to as initial water addition stirring step), and then water is further added, and the mixture is subjected to stirring again (hereinafter, also referred to as the second water addition stirring step). The number of times of adding water and the number of times of stirring the mixture are preferably at least twice, in each of the initial water addition stirring step and the second water addition stirring step. If the addition of water and the stirring are performed twice or more, respectively, as mentioned above, the concentration of the ultrafine particle grouting composition can be easily adjusted. As a result, slurry with high dispersibility and high dispersion retainability can be obtained. In the above-mentioned production method, the above-mentioned components are preferably used as the components (ultrafine particle cement, polycarboxylic acid dispersant, water, and the like) contained in the ultrafine particle grouting composition.

The above-mentioned number of times of adding water and the above-mentioned number of times of stirring are not especially limited as long as each number of times is two or more. The number of times of adding water may be different from the number of times of stirring as long as each number of times is two or more and the method include the initial water addition stirring step and the second water addition stirring step. The production method of the ultrafine particle grouting composition, performing the water addition and the stirring twice or more respectively is also referred to as "two-step water addition stirring method". The above-mentioned numbers of times of adding water and stirring are each preferably two because increase in the number of times thereof complicates the steps.

Hereinafter, the initial water addition stirring step and the second water addition stirring step are mentioned. If the water addition is performed more than twice, water addition other than water addition performed in the initial water addition stirring step and the second water addition stirring step (also referred to as other water additions) is not especially limited as long as the water addition is performed before the second water addition stirring step. In other water additions, an amount of added water in each addition is not especially limited as long as a ratio by weight of water/ultrafine particle cement mentioned below in the secondary water addition stirring step is satisfied. If the stirring is performed more than twice, the stirring may be performed at any stages, for example, before the initial water addition stirring step, or between the initial water addition stirring step and the second water addition stirring step, or after the second water addition stirring step. The stirring may be performed continuously.

With respect to the addition amount of water in the above-mentioned initial water addition stirring step and the above-mentioned second water addition stirring step, it is preferable that the initial water addition stirring step is performed at a smaller ratio by weight of water/ultrafine particle cement than a predetermined ratio thereof and the second water addition stirring step is performed at the predetermined ratio. In the above-mentioned two-step water addition stirring method, the adsorption of the dispersant to the cement particles is adsorption in the liquid. Therefore, the initial water addition stirring step is performed at a smaller ratio by weight of water/ultrafine particle cement, and thereby a water film can be rapidly formed on the cement particle surface. Further, the smaller ratio by weight of water/ultrafine particle cement makes it possible to keep the high concentration of the dispersant in the liquid, and thereby the rate of the adsorption to the particles is increased and a uniform adsorption layer can be formed on the particle surface. In the second water addition stirring step, slurry obtained by adding water until the below-mentioned ratio by weight of water/ultrafine particle cement and then stirring the mixture again has high dispersibility and high dispersion retainability, and such slurry can be preferably used as a grout.

It is preferable that the above-mentioned ratio by weight of water/ultrafine particle cement is 30 to 90% in the initial water addition stirring step (at the time of initial stirring). If the ratio by weight is less than 30%, the water quantity is small and the mixing and the stirring may be performed inhomogeneously. If the ratio by weight is more than 90%, the initial dispersant adsorption amount is small, and therefore dispersion effects attributed to the two-step water addition stirring method may not be obtained. The ratio by weight is more preferably 40 to 70%.

The above-mentioned ratio by weight of water/ultrafine particle cement in the second water addition stirring step is preferably within the above range mentioned in the ratio by weight of water/ultrafine particle cement (A) or (B) of the above-mentioned ultrafine particle grouting composition, and preferably 100 to 10000%. Within the above-mentioned range, the obtained ultrafine particle grouting composition may be used in a grout application as it is. In the two-step water addition stirring method of the present invention, a small quantity of water is added and stirring is performed in the initial water addition stirring step, and in the second water addition stirring step, the stirring is performed at the ratio by weight of water/ultrafine particle cement within the above-mentioned range as a preferable ratio by weight of water/ultrafine particle cement at the time of injection into grounds and the like. As a result, homogeneous slurry is prepared and such slurry can be preferably used as a grout.

The stirring speed in the above-mentioned two-step water addition stirring method is not especially limited, but the stirring in the initial water addition stirring step and the second water addition stirring step is preferably performed at a peripheral speed of 37.7 m/min or more and also preferably at 300 rpm or more. If the stirring is performed at a peripheral speed of less than 37.7 m/min, the stirring is insufficient and therefore homogeneous slurry may not be obtained. The stirring at less than 300 rpm also may cause the same results. The peripheral speed is 75.4 m/min or more, and still more preferably 125.6 m/min or more, and also more preferably 600 rpm or more and still more preferably 1000 rpm or more. The upper limit of the stirring speed is not especially limited. The stirring is performed more than two times, the stirring speed except for that in the initial water addition stirring step and the second water addition stirring step is preferably as mentioned above.

The above-mentioned two-step water addition stirring method is not especially limited as long as the method includes a step of mixing and stirring ultrafine particle cement and water as essential components, and further adding water and performing stirring again. The polycarboxylic acid dispersant essentially contained in the above-mentioned ultrafine particle grouting composition may be added at any stage. In order to obtain homogeneous slurry without aggregation of the ultrafine particle cement, the above-mentioned polycarboxylic acid dispersant preferably has an embodiment in which the polycarboxylic acid dispersant is contained in the initial water addition stirring step. A mixing embodiment of such a polycarboxylic acid dispersant is preferably the same as that mentioned as a method of adding the ultrafine particle cement, the polycarboxylic acid dispersant, and the water, in the above-mentioned high-speed stirring step. That is, the above-mentioned embodiments (1) to (3) (the embodiment (1) in which the cement is added to a dispersant solution (water+dispersant), an embodiment (2) in which the cement is added to a solution prepared by adding dispersant in powder form to the water, and an embodiment (3) in which the water is added to a mixture of the cement and the dispersant are preferable. Among them, if a liquid dispersant is used, the embodiment (1) in which the cement is added to a dispersant solution (water+dispersant) is preferable.

In the above-mentioned two-step water addition stirring method, as mentioned above, it is preferable that, in the initial water addition stirring step, the components are mixed and stirred at a ratio by weight of water/ultrafine particle cement of 30 to 70% and it is preferable that, in the second water addition stirring step, the components are mixed and stirred at a ratio by weight of water/ultrafine particle cement of 100 to 10000%. As mentioned above, the preferable embodiments of the present invention include a slurry for ultrafine particle cement grouts produced by a mixing and stirring method, wherein the mixing and stirring method is a two-step water addition stirring method of performing mixing and stirring at a ratio by weight of water/ultrafine particle cement of 30 to 70% in the initial stirring and then adding water until the ratio by weight of water/ultrafine particle cement reaches a predetermined value, and performing stirring again.

The high-speed stirring method and the two-step water addition stirring method of the present invention may be singly used. It is preferable that the high-speed stirring method and the two-step water addition stirring method are employed in combination. Combination of these methods makes it possible to produce an ultrafine particle grouting composition with high dispersibility and high dispersion retainability. The combination method is not especially limited as long as the method includes the high-speed stirring step of performing mixing and stirring at a peripheral speed of 314 m/min or more and the step of: mixing and stirring ultrafine particle cement and water; adding water; and performing stirring again. It is preferable that at least one of the initial water addition stirring step and the second water addition stirring step in the two-step water addition stirring method is the high-speed stirring step of performing mixing and stirring at a peripheral speed of 314 m/min or more. Further, the combination method more preferably includes the high-speed stirring step of performing mixing and stirring at 2500 rpm or more and the step of: mixing and stirring ultrafine particle cement and water; adding water; and performing stirring again. It is preferable that at least one of the initial water addition stirring step and the second water addition stirring step in the two-step water addition stirring method is the high-speed stirring step of performing mixing and stirring at 2500 rpm or more. It is more preferable that the high-speed stirring is performed in the initial water addition stirring step. It is still more preferable that the high-speed stirring is performed in both the initial water addition stirring step and the second water additions stirring step.

The above-mentioned high-speed stirring method and/or the above-mentioned two-step water addition stirring method may be employed as a method of stirring slurry for grouts using conventional ultrafine particle cement. The generation amount of the aggregated particles can be reduced, and an ultrafine particle grouting composition with excellent injectability can be obtained.

The ultrafine particle grouting composition of the present invention has the above-mentioned configuration. Such a composition is used by being easily injected into spaces between particles of grounds or rock cracks for water shutoff, prevention of liquefaction, improvement of soft grounds, or prevention of leakage of toxic substances. Such a composition is widely used in foundation works in civil engineering and construction. Further, such a composition can be easily injected into extremely minute spaces between particles of grounds or rock cracks into which conventional ultrafine particle cement grout could not be injected due to the particle diameter thereof. In addition, the production method of the ultrafine particle grouting composition of the present invention is a method for producing such an ultrafine particle grouting composition without particular facilities or production lines.

BEST MODES FOR CARRYING OUT THE INVENTION

The present invention is described in more detail below with reference to the following Examples, but is not limited to these Examples.

Polycarboxylic acid copolymers (1) to (11) (also referred to as "polymers (1) to (11)") were produced and measured for weight average molecular weight. The measurement conditions are as follows.

(Weight average molecular weight measurement condition)

Model: Waters LCM1,

Detector: Waters 410 differential refractive index detector

Analysis software: Waters Millenium Ver.2.18

Eluent: A solution prepared by dissolving sodium acetate trihydrate 115.6 g in a mixture solution containing water 10999 g and acetonitrile 6001 g and further adjusting the mixture to pH 6 with 30% by weight sodium hydroxide. Flow rate of the eluent: 0.8 ml/min, 35° C. of column temperature, Column: product of TOSOH Corp., TSKgel Guard Column SWXL+G4000SWXL+G3000SWXL+G2000SWXL Standard substance: polyethylene glycols, weight average molecular weight (Mw) 272500, 219300, 85000, 46000, 24000, 12600, 4250, 7100, 1470

Production Example 1

Water 149.5 g was charged into a glass reactor equipped with a thermometer, a stirrer, a dropping funnel, a nitrogen introduction tube, and a reflex condense. Under stirring, the inside of the reactor was substituted with nitrogen and heated to 80° C. under nitrogen atmosphere. After the inner temperature was stabilized at 80° C., a monomer aqueous solution 120.51 g containing methoxypolyethylene glycol monomethacrylate (the average molar number of addition of the ethylene oxides is 75) 47.41 g, methacrylic acid 12.58 g, water 60.05 g, 3-mercaptopropionic acid 0.51 g and an aqueous solution 30 g in which ammonium persulfate 0.69 g was dissolved were added dropwise into the reactor over four hours and five hours, respectively. Then, the temperature was maintained at 80° C. for one more hour, and the polymerization reaction was completed. After completion of the reaction, the reactant was neutralized with sodium hydroxide to obtain a polycarboxylic acid copolymer (1) of the present invention. The obtained polycarboxylic acid copolymer (1) of the present invention had a weight average molecular weight of 30500.

Production Example 2

Water 498.6 g was charged into a glass reactor equipped with a thermometer, a stirrer, a dropping funnel, a nitrogen introduction tube, and a reflex condenser. Under stirring, the inside of the reactor was substituted with nitrogen and heated to 80° C. under nitrogen atmosphere. After the inner temperature was stabilized at 80° C., a monomer aqueous solution 401.38 g containing methoxypolyethylene glycol monomethacrylate (the average molar number of addition of the ethylene oxides of 75) 166.80 g, methacrylic acid 33.2 g, water 200.01 g, 3-mercaptopropionic acid 1.38 g and an aqueous solution 100 g in which ammonium persulfate 2.30 g was dissolved were added dropwise into the reactor over four hours and five hours, respectively. Then, the temperature was maintained at 80° C. for one more hour, and the polymerization reaction was completed. After completion of the reaction, the reactant was neutralized with sodium hydroxide to obtain a polycarboxylic acid copolymer (2) of the present invention. The obtained polycarboxylic acid copolymer (2) of the present invention had a weight average molecular weight of 39800.

Production Example 3

Water 90.0 g was charged into a glass reactor equipped with a thermometer, a stirrer, a dropping funnel, a nitrogen introduction tube, and a reflex condenser. Under stirring, the inside of the reactor was substituted with nitrogen and heated to 50° C. under nitrogen atmosphere. After the inner temperature was stabilized at 50° C., a monomer aqueous solution 150.28 g containing methoxypolyethylene glycol monomethacrylate (the average molar number of addition of the ethylene oxides of 75) 53.87 g, methacrylic acid 6.13 g, water 90.0 g, 3-mercaptopropionic acid 0.28 g was added into the reactor over 4 hours, and simultaneously an aqueous solution 30 g in which L-ascorbic acid 0.31 g was solved and an aqueous solution 30 g in which hydrogen peroxide 0.24 g was solved were each added dropwise into the reactor over 5 hours. Then, the temperature was maintained at 50° C. for one more hour, and the polymerization reaction was completed. After completion of the reaction, the reactant was neutralized with sodium hydroxide to obtain a polycarboxylic acid copolymer (3) of the present invention. The obtained polycarboxylic acid copolymer (3) of the present invention had a weight average molecular weight of 62300.

Production Example 4

Water 99.6 g was charged into a glass reactor equipped with a thermometer, a stirrer, a dropping funnel, a nitrogen introduction tube, and a reflex condenser. Under stirring, the inside of the reactor was substituted with nitrogen and heated to 80° C. under nitrogen atmosphere. After the inner temperature was stabilized at 80° C., a monomer aqueous solution 170.44 g containing methoxypolyethylene glycol monomethacrylate (the average molar number of addition of the ethylene oxides of 25) 100.65 g, methacrylic acid 34.35 g, water 33.97 g, 3-mercaptopropionic acid 1.69 g and an aqueous solution 30 g in which ammonium persulfate 1.62 g was dissolved were added dropwise into the reactor over four hours and five hours, respectively. Then, the temperature was maintained at 80° C. for one more hour, and the polymerization reaction was completed. After completion of the reaction, the reactant was neutralized with sodium hydroxide to obtain a polycarboxylic acid copolymer (4) of the present invention. The obtained polycarboxylic acid copolymer (4) of the present invention had a weight average molecular weight of 18000.

Production Example 5

Water 99.8 g was charged into a glass reactor equipped with a thermometer, a stirrer, a dropping funnel, a nitrogen introduction tube, and a reflex condenser. Under stirring, the inside of the reactor was substituted with nitrogen and heated to 80° C. under nitrogen atmosphere. After the inner temperature was stabilized at 80° C., a monomer aqueous solution 170.21 g containing methoxypolyethylene glycol monomethacrylate (the average molar number of addition of the ethylene oxides of 25) 106.68 g, methacrylic acid 28.32 g, water 33.75 g, 3-mercaptopropionic acid 1.46 g and an aqueous solution 30 g in which ammonium persulfate 1.62 g was dissolved were added dropwise into the reactor over four hours and five hours, respectively. Then, the temperature was maintained at 80° C. for one more hour, and the polymerization reaction was completed. After completion of the reaction, the reactant was neutralized with sodium hydroxide to obtain a polycarboxylic acid copolymer (5) of the present invention. The obtained polycarboxylic acid copolymer (5) of the present invention had a weight average molecular weight of 22000.

Production Example 6

Water 100.0 g was charged into a glass reactor equipped with a thermometer, a stirrer, a dropping funnel, a nitrogen introduction tube, and a reflex condenser. Under stirring, the inside of the reactor was substituted with nitrogen and heated to 80° C. under nitrogen atmosphere. After the inner temperature was stabilized at 80° C., a monomer aqueous solution 169.99 g containing methoxypolyethylene glycol monomethacrylate (the average molar number of addition of the ethylene oxides of 25) 112.59 g, methacrylic acid 22.41 g, water 33.75 g, 3-mercaptopropionic acid 1.24 g and an aqueous solution 30 g in which ammonium persulfate 1.62 g was dissolved were added dropwise into the reactor over four hours and five hours, respectively. Then, the temperature was maintained at 80° C. for one more hour, and the polymerization reaction was completed. After completion of the reaction, the reactant was neutralized with sodium hydroxide to obtain a polycarboxylic acid copolymer (6) of the present invention. The obtained polycarboxylic acid copolymer (6) of the present invention had a weight average molecular weight of 23000.

Production Example 7

Water 83.2 g was charged into a glass reactor equipped with a thermometer, a stirrer, a dropping funnel, a nitrogen introduction tube, and a reflex condenser. Under stirring, the inside of the reactor was substituted with nitrogen and heated to 58° C. under nitrogen atmosphere. After the inner temperature was stabilized at 58° C., a hydrogen peroxide aqueous solution containing hydrogen peroxide 1.89 g and water 45.37 g was added. Then, a monomer aqueous solution 241.59 g containing unsaturated polyalkylene glycol ether 84.81 g prepared by adding an average 50 mol of ethylene oxides to 1 mol of 3-methyl-3-butene-1-ol, acrylic acid 97.47 g, and water 59.31 g, and an aqueous solution 27.94 g prepared by dissolving L-ascorbic acid 2.45 g and 3-mercaptopropionic acid 2.21 g into water 23.28 g were added dropwise for 3 hours and 3.5 hours, respectively. Then, the temperature was maintained at 58° C. for one more hour, and the polymerization reaction was completed. After completion of the reaction, the reactant was neutralized with sodium hydroxide to obtain a polycarboxylic acid copolymer (7) of the present invention. The obtained polycarboxylic acid copolymer (7) of the present invention had a weight average molecular weight of 19500.

Production Example 8

Water 83.2 g was charged into a glass reactor equipped with a thermometer, a stirrer, a dropping funnel, a nitrogen introduction tube, and a reflex condenser. Under stirring, the inside of the reactor was substituted with nitrogen and heated to 58° C. under nitrogen atmosphere. After the inner temperature was stabilized at 58° C., a hydrogen peroxide aqueous solution containing hydrogen peroxide 1.24 g and water 29.64 g was added. Then, a monomer aqueous solution 247.4 g containing unsaturated polyalkylene glycol ether 120.65 g prepared by adding an average 50 mol of ethylene oxides to 1 mol of 3-methyl-3-butene-1-ol, acrylic acid 61.63 g, water 65.12 g, and an aqueous solution 38.52 g prepared by dissolving L-ascorbic acid 1.60 g and 3-mercaptopropionic acid 1.45 g into water 35.48 g were added dropwise for 3 hours and 3.5 hours, respectively. Then, the temperature was maintained at 58° C. for one more hour, and the polymerization reaction was completed. After completion of the reaction, the reactant was neutralized with sodium hydroxide to obtain a polycarboxylic acid copolymer (8) of the present invention. The obtained polycarboxylic acid copolymer (8) of the present invention had a weight average molecular weight of 25700.

Production Example 9

Into a glass reactor equipped with a thermometer, a stirrer, a dropping funnel, a nitrogen introduction tube, and a reflex condenser, water 504.67 g, and unsaturated polyalkylene glycol ether 682.77 g prepared by adding an average 50 mol of ethylene oxides to 1 mol of 3-methyl-3-butene-1-ol were charged. Under stirring, the inside of the reactor was substituted with nitrogen and heated to 58° C. under nitrogen atmosphere. After the inner temperature was stabilized at 58° C., a hydrogen peroxide aqueous solution containing hydrogen peroxide 1.44 g and water 31.11 g was added. Then, acrylic acid 129.51 g, and an aqueous solution 149.27 g prepared by solving L-ascorbic acid 1.86 g and 3-mercaptopropionic acid 3.92 g into water 143.49 g were added dropwise for 3 hours and 3.5 hours, respectively. Then, the temperature was maintained at 58° C. for one more hour, and the polymerization reaction was completed. After completion of the reaction, the reactant was neutralized with sodium hydroxide to obtain a polycarboxylic acid copolymer (9) of the present invention. The obtained polycarboxylic acid copolymer (9) of the present invention had a weight average molecular weight of 30000.

Production Example 10

Into a glass reactor equipped with a thermometer, a stirrer, a dropping funnel, a nitrogen introduction tube, and a reflex condenser, water 76.91 g, and unsaturated polyalkylene glycol ether 149.28 g prepared by adding an average 50 mol of ethylene oxides to 1 mol of 3-methyl-3-butene-1-ol were charged. Under stirring, the inside of the reactor was substituted with nitrogen and heated to 58° C. under nitrogen atmosphere. After the inner temperature was stabilized at 58° C., a hydrogen peroxide aqueous solution containing hydrogen peroxide 0.23 g and water 11.63 g was added. Then, acrylic acid 20.17 g, and an aqueous solution 88.27 g prepared by dissolving L-ascorbic acid 0.30 g and 3-mercaptopropionic acid 0.79 g into water 87.18 g were added dropwise for 3 hours and 3.5 hours, respectively. Then, the temperature was maintained at 58° C. for one more hour, and the polymerization reaction was completed. After completion of the reaction, the reactant was neutralized with sodium hydroxide to obtain a polycarboxylic acid copolymer (10) of the present invention. The obtained polycarboxylic acid copolymer (10) of the present invention had a weight average molecular weight of 35000.

Production Example 11

Into a glass reactor equipped with a thermometer, a stirrer, a dropping funnel, a nitrogen introduction tube, and a reflex condenser, water 147.42 g, and an unsaturated polyalkylene glycol ether 98.11 g prepared by adding an average 150 mol of ethylene oxides to 1 mol of methallyl alcohol were charged. Under stirring, the inside of the reactor was substituted with nitrogen and heated to 58° C. under nitrogen atmosphere. After the inner temperature was stabilized at 58° C., a hydrogen peroxide aqueous solution containing hydrogen peroxide 0.09 g and water 2.13 g was added. Then, acrylic acid 8.35 g, and an aqueous solution 20.2 g prepared by dissolving L-ascorbic acid 0.12 g and 3-mercaptopropionic acid 0.21 g into water 19.87 g were added dropwise for 3 hours and 3.5 hours, respectively. Then, the temperature was maintained at 58° C. for one more hour, and the polymerization reaction was completed. After completion of the reaction, the reactant was neutralized with sodium hydroxide to obtain a polycarboxylic acid copolymer (11) of the present invention. The obtained polycarboxylic acid copolymer (11) of the present invention had a weight average molecular weight of 65000.

"Performance Evaluation Test"

The following materials were used to prepare slurries (ultrafine particle grouting composition). Each slurry was evaluated for performances. Tables 1 and 2 show the results.

"Used Materials"

(1) Ultrafine particle grout (ultrafine particle cement): Nittetsu Super Fine (0.5% by volume of particles having a particle diameter of 16 μm or more) (product of Nittetsu Cement Co., Ltd.)

Fine particle grout: Nittetsu Colloid (13.6% by volume of particles having a particle diameter of 16 μm or more) (product of Nittetsu Cement Co., Ltd.)

The above-mentioned particle amount was measured by subjecting the grout to treatment for three minutes by an ultrasonic washing machine (output 40 W, frequency 40 kHz) using ethanol as a dispersion medium.

The above-mentioned particle amount represents a particle amount of particles having a particle diameter of 16 μm or more contained in the ultrafine particle grout. The amount of the particles having a particle diameter of 16 μm or more in the ultrafine particle grout was measured using Laser Diffraction Particle Size Analyzer (product of Shimazu Corp., SALD-2000J, a refractive index of 1.70±0.20i).

(2) Dispersants for Ultrafine Particle Grouts

Polycarboxylic acid dispersants (the above-mentioned polymers (1) to (11))

Naphthalene dispersant: formalin condensate of naphthalene sulfonate, MIGHTY 150 (normal type) and MIGHTY 150R (retardation type) each produced by Kao Corp.

(Preparation Method of Grouting Slurry)

Water 375 g containing a dispersant was added to Super Fine 375 g and the mixture was stirred for 3 minutes at 600 rpm (at a peripheral speed of 75.4 m/min) to prepare an injectable slurry.

(Method of Testing Permeability)

A test apparatus prepared by processing an acryl pipe with a diameter of 55 mm was prepared. Standard sand (from Yamaguchi Toyoura) was weighed so as to have a porosity of 45% by volume and the sand was charged into the pipe. Thereby, a sand layer in 15 cm was prepared. The prepared slurry 500 ml was charged from an upper part of the apparatus and simultaneously, a lower cock was opened and the slurry was permeated into the sand layer. After 5 minutes had passed, the length of the sand layer through which the slurry was passed was measured.

(Method of Testing Permeation Retainability)

As performed in the permeation test method, the slurry was measured for permeation retainability 30 minutes and 60 minutes later after water was added to Super Fine. The slurry was stirred at 300 rpm (at a peripheral speed of 37.7 m/min) for preventing precipitation until the measurement time of 30 minutes and 60 minutes.

(Setting Time Evaluation Test Method)

Super Fine 1200 g was charged into water containing the dispersant 600 g, and the mixture was stirred at 600 rpm (at a peripheral speed of 75.4 m/min) for 3 minutes to prepare a grouting slurry. Then, the slurry was measured for penetration resistance value according to proctor needle test method of JIS A 1147-2001, and thereby measured for initial setting time and final setting time. Thereby, the slurry was evaluated for setting characteristics.

Example 1, Comparative Examples 1 and 2

Slurries were prepared using the above-mentioned Nittetsu Super Fine, the copolymer (1), MIGHTY 150 and MIGHTY 150R, respectively. The slurries were evaluated according to the above-mentioned performance evaluation test. Table 1 shows the results.

TABLE 1

|  | Used dispersant | Permeation test | | Permeation retainability test (dispersant dosage 0.6 wt %) | | Setting time measurement test (dispersant dosage 0.4 wt %) | |
|---|---|---|---|---|---|---|---|
|  |  | Dispersant dosage (wt %) | Permeation length (cm) | Time (minute) | Permeation length (cm) | Initial time (hr) | Final time (hr) |
| Example 1 | Copolymer 1 | 0.4 | 14 | 0 | 15 | 26 | 30 |
|  |  | 0.6 | 15 | 30 | 15 |  |  |
|  |  | 0.8 | 15 | 60 | 14 |  |  |
| Comparative Example 1 | MIGHTY 150 | 0.4 | 4 | 0 | 6 | 10 | 11 |
|  |  | 0.6 | 6 | 30 | 6.5 |  |  |
|  |  | 0.8 | 6 | 60 | 4 |  |  |
| Comparative Example 2 | MIGHTY 150R | 0.4 | 12 | 0 | 15 | 71 | 74 |
|  |  | 0.6 | 15 | 30 | 14 |  |  |
|  |  | 0.8 | 15 | 60 | 11.5 |  |  |

Examples 2 to 12, Comparative Examples 3 and 4

Slurries were prepared using the above-mentioned Nittetsu Super Fine, copolymers (1) to (11), MIGHTY 150 and MIGHTY 150R, respectively. The slurries were evaluated according to the above-mentioned performance evaluation test. Table 2 shows the results.

Comparative Example 5

A slurry was prepared under the same conditions as in Example 2, except that the above-mentioned Nittetsu Colloid was used instead of the above-mentioned Nittetsu Super Fine. The prepared slurry was evaluated according to the above-mentioned performance evaluation test. Table 2 shows the results.

TABLE 2

|  | Used dispersant | Polymer structure | | | Permeation test | Setting time measurement test | |
|---|---|---|---|---|---|---|---|
|  |  | Structure | Number of r | Monomer ratio by mol (B/A) | Permeation length (cm) | Initial time (hr) | Final time (hr) |
| Example 2 | Copolymer 1 | P-1 | 75 | 10.5 | 14 | 26 | 30 |
| Example 3 | Copolymer 2 | P-1 | 75 | 7.9 | 11 | — | — |
| Example 4 | Copolymer 3 | P-1 | 75 | 4.5 | 5 | — | — |
| Example 5 | Copolymer 4 | P-1 | 25 | 4.8 | 13 | — | — |
| Example 6 | Copolymer 5 | P-1 | 25 | 3.7 | 12 | 49 | 52 |
| Example 7 | Copolymer 6 | P-1 | 25 | 2.8 | 5.5 | — | — |
| Example 8 | Copolymer 7 | P-2 | 50 | 36.5 | 8.5 | — | — |
| Example 9 | Copolymer 8 | P-2 | 50 | 16.2 | 12.5 | — | — |
| Example 10 | Copolymer 9 | P-2 | 50 | 6.1 | 15 | 41 | 47 |
| Example 11 | Copolymer 10 | P-2 | 50 | 4.3 | 5 | — | — |
| Example 12 | Copolymer 11 | P-2 | 150 | 7.9 | 4.5 | — | — |
| Comparative Example 3 | MIGHTY 150 | — | — | — | 4 | 10 | 12 |
| Comparative Example 4 | MIGHTY 150R | — | — | — | 12 | 71 | 73 |
| Comparative Example 5 | Copolymer 1 | P-1 | 75 | 10.5 | 1 | — | — |

In Table 2, P-1 and P-2 represent polycarboxylic acid copolymer (P-1) and polycarboxylic acid copolymer (P-2), respectively.

Table 2 shows that as the amount of the carboxylic acid increases, the permeation increases, and that as the number of r increases, the slurry was set more quickly.

In the above-mentioned Examples, the copolymers 1 to 11 were used as the polycarboxylic acid copolymer in accordance with the above-mentioned embodiment (i). The functional mechanisms of generating the functional effects of the present invention are the same as long as the compositions have the embodiment in which the copolymer contains the above-mentioned specific two repeating units. That is, it is one of the characteristics of the present invention that the polycarboxylic acid copolymer has the above-mentioned specific two repeating units. The composition exhibits the effects shown in these Examples, if the above-mentioned two repeating units have similar chemical characteristics. Therefore, the ultrafine particle grouting composition of the present invention is prepared using the polycarboxylic acid copolymer containing the above-mentioned specific two repeating unit according to the present invention surely exhibit advantageous effects of the present invention. At least in the cases where the polycarboxylic acid copolymer of the present invention contains the above-mentioned polycarboxylic acid copolymer (P-1) and/or the above-mentioned polycarboxylic acid copolymer (P-2), the above-mentioned Examples and Comparative Examples sufficiently prove the advantageous effects of the present invention and support the technical meanings of the present invention.

"Used Material"

Super ultrafine particle cement: Super ultrafine particle cements were prepared by intergrinding materials shown in Table 3 were mixed at proportions shown in Table 4 and classifying the interground materials into a predetermined particle size by a classifier.

The content of the particles with 1 to 5 μm (% by volume) (particle amount) in Table 4 was measured by subjecting the cement to treatment for three minutes by an ultrasonic washing machine (output 40 W, frequency 40 kHz) using ethanol as a dispersion medium.

The above-mentioned content of the particles with 1 to 5 μm (% by volume) (particle amount) represents an amount of particles having a particle diameter of 1 to 5 μm contained in the super ultrafine particle cement. The super ultrafine particle cement in powder form was measured for the particle amount using Laser Diffraction Particle Size Analyzer (product of Shimazu Corp., SALD-2000J, a refractive index of 1.70±0.20i).

TABLE 3

| Material | Manufacturer/ Production area | C3S (% by weight) | C3A (% by weight) |
|---|---|---|---|
| Cement clinker A | Nittetsu Cement Co., Ltd. | 59.9 | 9.3 |
| Cement clinker B | Nittetsu Cement Co., Ltd. | 43.3 | 3.7 |
| Cement clinker C | Nittetsu Cement Co., Ltd. | 44.0 | 4.6 |
| Blast furnace slag (water granulated slag) | Nippon Steel Corp. | — | — |
| Natural anhydrous gypsum | Thailand | — | — |

TABLE 4

| | Content (% by weight) | | | | | Content (% by volume) Particles with 1 to 5 μm |
|---|---|---|---|---|---|---|
| | Cement clinker A | Cement clinker B | Cement clinker C | Blast furnace slag | Natural anhydrous gypsum | |
| Super ultrafine particle cement 1 | 0 | 10 | 0 | 87 | 3 | 70.3 |
| Super ultrafine particle cement 2 | 0 | 20 | 0 | 77 | 3 | 71.0 |
| Super ultrafine particle cement 3 | 0 | 34 | 0 | 63 | 3 | 72.3 |
| Super ultrafine particle cement 4 | 10 | 0 | 0 | 87 | 3 | 70.8 |
| Super ultrafine particle cement 5 | 0 | 5 | 0 | 92 | 3 | 66.8 |
| Super ultrafine particle cement 6 | 0 | 10 | 0 | 86 | 4 | 74.1 |
| Super ultrafine particle cement 7 | 0 | 10 | 0 | 88 | 2 | 72.1 |
| Super ultrafine particle cement 8 | 0 | 0 | 10 | 87 | 3 | 70.8 |
| Ultrafine particle cement 1 | 0 | 10 | 0 | 87 | 3 | 50.0 |

Each of the super ultrafine particle cements 1 to 8 contained 0% by volume of particles having a particle diameter of 16 μm or more in powder form of the cement.

The ultrafine particle cement 1 had 1.2% by volume of particles having a particle diameter of 16 μm or more in powder form of the cement.

Dispersant: Polycarboxylic acid dispersants and a naphthalene dispersant shown in Table 5 were used as the dispersant.

The dispersant c (also referred to as the polycarboxylic acid copolymer (12) or copolymer (12)) and the dispersant d (also referred to as the polycarboxylic acid copolymer (13) or the copolymer (13)) were prepared by the following methods and measured for weight average molecular weight. The measurement method was as mentioned above.

Production Method of Copolymer 12 (Dispersant c)

Water 99.8 g was charged into a glass reactor equipped with a thermometer, a stirrer, a dropping funnel, a nitrogen introduction tube, and a reflex condenser. Under stirring, the inside of the reactor was substituted with nitrogen and heated to 80° C. under nitrogen atmosphere. After the inner temperature was stabilized at 80° C., a monomer aqueous solution 170.21 g containing methoxypolyethylene glycol monomethacrylate (the average molar number of addition of the ethylene oxides of 25) 106.68 g, methacrylic acid 28.32 g, water 33.75 g, 3-mercaptopropionic acid 1.46 g and an aqueous solution 30 g in which ammonium persulfate 1.62 g was dissolved were added dropwise into the reactor over four hours and five hours, respectively. Then, the temperature was maintained at 80° C. for one more hour, and the polymerization reaction was completed. After completion of the reaction, the reactant was neutralized with sodium hydroxide to obtain a polycarboxylic acid copolymer (12) of the present invention. The obtained polycarboxylic acid copolymer (12) of the present invention had a weight average molecular weight of 22000.

Production Method of Copolymer 13 (Dispersant d)

Water 149.5 g was charged into a glass reactor equipped with a thermometer, a stirrer, a dropping funnel, a nitrogen introduction tube, and a reflex condenser. Under stirring, the inside of the reactor was substituted with nitrogen and heated to 80° C. under nitrogen atmosphere. After the inner temperature was stabilized at 80° C., a monomer aqueous solution 120.51 g containing methoxypolyethylene glycol monomethacrylate (the average molar number of addition of the ethylene oxides of 75) 47.41 g, methacrylic acid 12.58 g, water 60.05 g, 3-mercaptopropionic acid 0.51 g and an aqueous solution 30 g in which ammonium persulfate 0.69 g was dissolved were added dropwise into the reactor over four hours and five hours, respectively. Then, the temperature was maintained at 80° C. for one more hour, and the polymerization reaction was completed. After completion of the reaction, the reactant was neutralized with sodium hydroxide to obtain a polycarboxylic acid copolymer (13) of the present invention. The obtained polycarboxylic acid copolymer (13) of the present invention had a weight average molecular weight of 30500.

TABLE 5

| Used dispersant | Kind of dispersant | Manufacturer |
| --- | --- | --- |
| a AQUALOC ® FC-600 | Polycarboxylic acid dispersant | Nippon Shokubai Co., Ltd. |
| b MIGHTY 150 | Naphthalene sulfonic acid dispersant | Kao Corp. |

TABLE 5-continued

| Used dispersant | Kind of dispersant | Manufacturer |
| --- | --- | --- |
| c Copolymer 12 | Polycarboxlic acid dispersant | — |
| d Copolymer 13 | Polycarboxlic acid dispersant | — |

Examples 13 to 30 and Comparative Examples 6 and 7

Examples adopting the high-speed stirring step are mentioned below.

"Evaluation Method"

Injection layer: An injection layer was prepared by charging 534 g of glass beads (J-150 product of Potters-Ballotini Co., Ltd., an average particle diameter of 90 μm) into an acryl pipe in φ 5.5 cm and subjecting the beads to water filling in such a way that the layer has a height of 15 cm and a porosity of 40% by volume. The glass bead layer had the smallest void diameter of 14 μm based on the calculation value in the closest packing and had a coefficient of permeability determined from Hazen approximation of $6.2 \times 10^{-3}$ cm/sec.

Slurry preparation method: A slurry was prepared by charging super ultrafine particle cement into an aqueous solution containing water and a dispersant, and stirring the mixture at a specific rotation speed for 3 minutes. The stirring was performed using multipurpose digital mixer (product of Iuchi Seieido Co., Ltd., the maximum rotation number of the stirring axis of 5000 rpm, the diameter of stirring blade of 40 mm) if the peripheral speed was 628 m/min or less (the maximum rotation number of the stirring axis was 5000 rpm or less) and using Blender (product of Oster Corp., the maximum rotation number of the stirring axis of 15700 rpm, the diameter of the stirring blade of 50 mm) if the peripheral speed was 1570 m/min (the maximum rotation number of the stirring axis was 10000 rpm).

Injection of slurry: The slurry 500 ml was injected from an upper part of the injection layer.

Evaluation: The slurry was evaluated based on the permeation length and the time needed for the slurry to pass through the injection layer. Table 6 shows the results.

TABLE 6

| | Cement (% by weight) | | | | | | | | |
| --- | --- | --- | --- | --- | --- | --- | --- | --- | --- |
| | Super ultrafine particle cement 1 | Super ultrafine particle cement 2 | Super ultrafine particle cement 3 | Super ultrafine particle cement 4 | Super ultrafine particle cement 5 | Super ultrafine particle cement 6 | Super ultrafine particle cement 7 | Super ultrafine particle cement 8 | Ultrafine particle cement 1 |
| Example 13 | 100 | — | — | — | — | — | — | — | — |
| Example 14 | 100 | — | — | — | — | — | — | — | — |
| Example 15 | 100 | — | — | — | — | — | — | — | — |
| Example 16 | 100 | — | — | — | — | — | — | — | — |
| Example 17 | 100 | — | — | — | — | — | — | — | — |
| Example 18 | — | 100 | — | — | — | — | — | — | — |
| Example 19 | 100 | — | — | — | — | — | — | — | — |
| Example 20 | — | — | 100 | — | — | — | — | — | — |
| Example 21 | — | — | 100 | — | — | — | — | — | — |
| Example 22 | — | — | — | 100 | — | — | — | — | — |
| Example 23 | — | — | — | 100 | — | — | — | — | — |
| Example 24 | — | — | — | — | 100 | — | — | — | — |
| Example 25 | — | — | — | — | — | 100 | — | — | — |
| Example 26 | — | — | — | — | — | — | 100 | — | — |
| Example 27 | — | — | — | — | — | — | — | 100 | — |

TABLE 6-continued

| | a | b | c | d | Ratio (% by weight) of water/cement | Peripheral speed (m/min) | Stirring axis rotation number (rpm) | Permeation length (cm) | Time required for passing (minute) |
|---|---|---|---|---|---|---|---|---|---|
| Example 28 | — | — | — | — | — | — | — | — | 100 |
| Example 29 | — | — | — | — | — | — | — | — | 100 |
| Example 30 | 100 | — | — | — | — | — | — | — | — |
| Comparative Example 6 | 100 | — | — | — | — | — | — | — | — |
| Comparative Example 7 | 100 | — | — | — | — | — | — | — | — |
| Example 13 | 2 | — | — | — | 1000 | 376.8 | 3000 | 15 | 16 |
| Example 14 | — | — | 2 | — | 1000 | 376.8 | 3000 | 15 | 10 |
| Example 15 | — | — | 2 | — | 1000 | 502.4 | 4000 | 15 | 10 |
| Example 16 | — | — | 2 | — | 1000 | 628 | 5000 | 15 | 11 |
| Example 17 | — | — | 2 | — | 1000 | 1570 | 10000 | 15 | 9 |
| Example 18 | — | — | 2 | — | 1000 | 376.8 | 3000 | 15 | 11 |
| Example 19 | — | — | 2 | — | 1000 | 251.2 | 2000 | 2.5 | Not passed |
| Example 20 | — | — | 2 | — | 1000 | 502.4 | 4000 | 9 | Not psssed |
| Example 21 | — | — | 2 | — | 1000 | 1570 | 10000 | 9 | Not passed |
| Example 22 | — | — | 2 | — | 1000 | 502.4 | 4000 | 7 | Not passed |
| Example 23 | — | — | 2 | — | 1000 | 1570 | 10000 | 8 | Not passed |
| Example 24 | — | — | 2 | — | 1000 | 1570 | 10000 | 15 | 9 |
| Example 25 | — | — | 2 | — | 1000 | 1570 | 10000 | 15 | 9 |
| Example 26 | — | — | 2 | — | 1000 | 1570 | 10000 | 15 | 9 |
| Example 27 | — | — | 2 | — | 1000 | 1570 | 10000 | 15 | 9 |
| Example 28 | — | — | 0.6 | — | 1000 | 502.4 | 4000 | 2 | Not passed |
| Example 29 | — | — | 2 | — | 1000 | 502.4 | 4000 | 2 | Not passed |
| Example 30 | — | — | — | 2 | 1000 | 376.8 | 3000 | 15 | 8 |
| Comparative Example 6 | — | 2 | — | — | 1000 | 502.4 | 4000 | 5 | Not passed |
| Comparative Example 7 | — | 2 | — | — | 1000 | 1570 | 10000 | 5 | Not passed |

Examples 31 to 40 and Comparative Example 8

Examples adopting the two-step water addition stirring method are shown below.

"Evaluation Method"

Slurry preparation method: A slurry was prepared by charging super ultrafine particle cement into an aqueous solution containing water and a dispersant, and performing initial stirring of the mixture at a peripheral speed of 75.4 m/min (600 rpm) for 3 minutes using multipurpose digital mixer (product of Iuchi Seieido Co., Ltd.) and then adding water into the mixture in such a way that a ratio by weight of water/super ultrafine particle cement was 1000%) and stirring the mixture at a peripheral speed of 75.4 m/min (600 rpm) for 1 minute. The evaluation of the slurry was the same as those in Example 13. Table 7 shows the results.

TABLE 7

| | Cement (% by weight) | | | | | Dispersant (% by weight) | | | | Ratio (% by weight) of water/super ultrafine particle cement in | Permeation length | Time required for passing |
|---|---|---|---|---|---|---|---|---|---|---|---|---|
| | Super ultrafine particle cement 1 | Super ultrafine particle cement 2 | Super ultrafine particle cement 3 | Super ultrafine particle cement 4 | Ultrafine particle cement 1 | a | b | c | d | initial stirring | (cm) | (minute) |
| Example 31 | 100 | — | — | — | — | 2 | — | — | — | 60 | 15 | 15 |
| Example 32 | 100 | — | — | — | — | — | — | 2 | — | 40 | 15 | 9 |
| Example 33 | 100 | — | — | — | — | — | — | 2 | — | 50 | 15 | 9 |
| Example 34 | 100 | — | — | — | — | — | — | 2 | — | 60 | 15 | 9 |
| Example 35 | — | 100 | — | — | — | — | — | 2 | — | 60 | 15 | 9 |
| Example 36 | 100 | — | — | — | — | — | — | 2 | — | 80 | 9 | Not passed |
| Example 37 | — | — | 100 | — | — | — | — | 2 | — | 60 | 12 | Not passed |
| Example 38 | — | — | — | 100 | — | — | — | 2 | — | 60 | 10 | Not passed |
| Example 39 | — | — | — | — | 100 | — | — | 2 | — | 60 | 2 | Not passed |
| Example 40 | 100 | — | — | — | — | — | — | — | 2 | 60 | 15 | 8 |
| Comparative Example 8 | 100 | — | — | — | — | — | 2 | — | — | 60 | 5 | Not passed |

In the above-mentioned Examples, the super ultrafine particle cements 1, 2, and 5 to 8 were used as the ultrafine particle cement in accordance with the above-mentioned embodiment (ii), and the dispersants a, c, and d shown in Table 5 were used as the polycarboxylic acid dispersant. The functional mechanisms of generating the functional effects of the present invention are the same as long as the compositions have the embodiment in which the composition essentially contains the specific super ultrafine particle cement and the polycarboxylic acid dispersant according to the present invention. That is, it is one of the characteristics of the present invention that the ultrafine particle grouting composition at least contains the above-mentioned two components essentially. The composition exhibits the effects shown in these Examples, if these two components have similar chemical characteristics. Therefore, the ultrafine particle grouting composition of the present invention containing these essential components according to the present invention surely exhibits advantageous effects of the present invention. At least in the cases where the composition further contains water, the above-mentioned Examples and Comparative Examples sufficiently prove the advantageous effects of the present invention and support the technical meanings of the present invention.

The present application claims priority to Japanese Patent Application No. 2006-030177 filed Feb. 7, 2006, entitled "ULTRAFINE PARTICLE GROUTING COMPOSITION." And Japanese Patent Application No. 2006-030178 filed Feb. 7, 2006, entitled "SUPER ULTRAFINE PARTICLE GROUTING COMPOSITION." The contents of these applications are incorporated herein by reference in their entirely.

The invention claimed is:

1. An ultrafine particle grouting composition comprising ultrafine particle cement,
wherein the ultrafine particle grouting composition is at least one selected from the group consisting of the following (i) and (ii):
(i) the ultrafine particle grouting composition comprises ultrafine particle cement (A) and a polycarboxylic acid dispersant (C), and
the ultrafine particle cement (A) comprises blast furnace slag and gypsum, and
the ultrafine particle cement (A) has 10% by volume or less of particles having a particle diameter of 16 μm or more in powder form of the cement; and
(ii) the ultrafine particle grouting composition comprises ultrafine particle cement (B) and a polycarboxylic acid dispersant (D), and
the ultrafine particle cement (B) comprises 2 to 25% by weight of cement clinker containing 5% by weight or less of $3CaO\cdot Al_2O_3$, 74 to 97% by weight of blast furnace slag, and 1 to 5% by weight of gypsum, and
the ultrafine particle cement (B) has 60 to 80% by volume of particles having a particle diameter of 1 to 5 μm in powder form of the cement; and wherein the polycarboxylic acid dispersant (C) or (D) comprises a polycarboxylic acid copolymer, the polycarboxylic acid copolymer being a polycarboxylic acid copolymer (P-1) having a polyoxyalkylene ester constitutional unit (I) represented by the following formula (3):

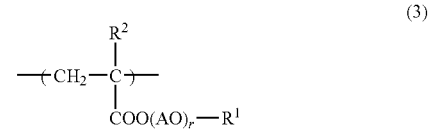

in the formula (3), $R^1$ representing a hydrogen atom or a hydrocarbon group containing 1 to 30 carbon atoms; $R^2$ being a hydrogen atom or a methyl group; AO representing an oxyalkylene group containing 2 to 18 carbon atoms; r representing a molar number of addition of the oxyalkylene group and being an integer of 2 to 300 and
a carboxylic acid constitutional unit (II) represented by the formula (4):

in the formula (4), $R^3$ representing a hydrogen atom, a methyl group, or $—COOM^2$; $R^5$ representing a hydrogen atom, a methyl group, or $—CH_2COOM^3$; $R^3$ representing a hydrogen atom or a methyl group when $R^5$ is $—CH_2COOM^3$; $M^1$, $M^2$, and $M^3$ each representing a member selected from the group consisting of a hydrogen atom, monovalent metal, divalent metal, ammonium group, and organic amine group.

2. The ultrafine particle grouting composition according to claim 1,
wherein the ultrafine particle cement (A) contained in the ultrafine particle grouting composition comprises 45 to 97% by weight of the blast furnace slag, 2 to 15% by weight of the gypsum, and 0 to 40% by weight of Portland cement.

3. The ultrafine particle grouting composition according to claim 1,
wherein the ultrafine particle cement (A) contained in the ultrafine particle grouting composition has 30% by volume or less of particles having a particle diameter of 2 μm or less.

4. The ultrafine particle grouting composition according to claim 1,
wherein a ratio (Y)/(X) of a molar number (Y) of the monomer represented by the formula (4) to a molar number (X) of the monomer represented by the formula (3) is 2.5 or more in the polycarboxylic acid copolymer contained in the polycarboxylic acid dispersant (C).

5. The ultrafine particle grouting composition according to claim 1,
wherein the r in the monomer represented by the formula (3) is an integer of 2 to 100 in the polycarboxylic acid copolymer contained in the polycarboxylic acid dispersant (C).

6. A production method of the ultrafine particle grouting composition of claim 1,
wherein the production method comprises a high-speed stuffing step of performing mixing and stuffing at a peripheral speed of 314 m/mm or more.

7. A production method of the ultrafine particle grouting composition of claim 1, wherein the production method comprises a step of: mixing and stirring ultrafine particle cement and water; adding water; and performing stirring again.

8. A production method of the ultrafine particle grouting composition of claim 2,
wherein the production method comprises a high-speed stuffing step of performing mixing and stirring at a peripheral speed of 314 m/mm or more.

9. A production method of the ultrafine particle grouting composition of claim 3,
wherein the production method comprises a high-speed stirring step of performing mixing and stirring at a peripheral speed of 314 m/mm or more.

10. A production method of the ultrafine particle grouting composition of claim 4,
wherein the production method comprises a high-speed stining step of performing mixing and stining at a peripheral speed of 314 m/mm or more.

11. A production method of the ultrafine particle grouting composition of claim 5,
wherein the production method comprises a high-speed stining step of performing mixing and stining at a peripheral speed of 314 m/mm or more.

12. A production method of the ultrafine particle grouting composition of claim 2,
wherein the production method comprises a step of: mixing and stirring ultrafine particle cement and water; adding water; and performing stirring again.

13. A production method of the ultrafine particle grouting composition of claim 3,
wherein the production method comprises a step of: mixing and stirring ultrafine particle cement and water; adding water; and performing stirring again.

14. A production method of the ultrafine particle grouting composition of claim 4,
wherein the production method comprises a step of: mixing and stirring ultrafine particle cement and water; adding water; and performing stirring again.

* * * * *

UNITED STATES PATENT AND TRADEMARK OFFICE
CERTIFICATE OF CORRECTION

PATENT NO. : 7,717,998 B2  Page 1 of 1
APPLICATION NO. : 11/672305
DATED : May 18, 2010
INVENTOR(S) : Tomohiro Kanazawa et al.

It is certified that error appears in the above-identified patent and that said Letters Patent is hereby corrected as shown below:

Claim 1, column 47,
  line 57, the "$3CaO.Al_2O_3$" should be "$3CaO \cdot Al_2O_3$";

Claim 6, column 49,
  line 64, "stuffing" should be "stirring";
  line 65, "m/mm" should read "m/min";

Claim 8, column 49,
  line 7, "stuffing" should be "stirring";
  line 8, "m/mm" should read "m/min";

Claim 9, column 49,
  line 13, "m/mm" should read "m/min";

Claim 10, column 49,
  line 17, "stining" should be "stirring";
  line 18, "m/mm" should read "m/min";

Claim 11, column 50,
  line 2, "stining" (2 instances) should be "stirring";
  line 3, "m/mm" should read "m/min".

Signed and Sealed this

Third Day of August, 2010

David J. Kappos
*Director of the United States Patent and Trademark Office*